United States Patent
Yamada et al.

(10) Patent No.: US 11,261,294 B2
(45) Date of Patent: *Mar. 1, 2022

(54) THERMOPLASTIC RESIN AND OPTICAL MEMBER

(71) Applicant: TEIJIN LIMITED, Osaka (JP)

(72) Inventors: Kyosuke Yamada, Osaka (JP);
Manabu Matsui, Osaka (JP);
Takatsune Yanagida, Osaka (JP);
Kazuyoshi Ogasawara, Osaka (JP);
Kazunori Nunome, Osaka (JP);
Keisuke Sato, Osaka (JP); Yasuhiko Tomonari, Osaka (JP)

(73) Assignee: TEIJIN LIMITED, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/638,594

(22) PCT Filed: Jul. 13, 2018

(86) PCT No.: PCT/JP2018/026613
§ 371 (c)(1),
(2) Date: Feb. 12, 2020

(87) PCT Pub. No.: WO2019/044214
PCT Pub. Date: Mar. 7, 2019

(65) Prior Publication Data
US 2021/0147621 A1    May 20, 2021

(30) Foreign Application Priority Data

Aug. 30, 2017   (JP) .............................. JP2017-165528

(51) Int. Cl.
| | | |
|---|---|---|
| C08G 64/06 | (2006.01) | |
| C08G 63/64 | (2006.01) | |
| C08G 63/672 | (2006.01) | |
| C08G 64/30 | (2006.01) | |
| G02B 1/04 | (2006.01) | |

(52) U.S. Cl.
CPC ............. *C08G 64/06* (2013.01); *C08G 63/64* (2013.01); *C08G 63/672* (2013.01); *C08G 64/30* (2013.01); *G02B 1/041* (2013.01)

(58) Field of Classification Search
USPC ....... 528/190, 193, 194, 196, 198, 271, 272, 528/273, 274, 300
See application file for complete search history.

(56) References Cited

U.S. PATENT DOCUMENTS

| | | | |
|---|---|---|---|
| 4,584,335 | A | 4/1986 | Parker |
| 5,532,331 | A | 7/1996 | Bales et al. |
| 5,910,562 | A | 6/1999 | Miura et al. |
| 2008/0085955 | A1 | 4/2008 | Yanagida et al. |
| 2010/0048855 | A1 | 2/2010 | Kato et al. |
| 2014/0051300 | A1 | 2/2014 | Yamakami |
| 2014/0268333 | A1 | 9/2014 | Tanaka et al. |
| 2015/0285954 | A1 | 10/2015 | Ishizuka et al. |
| 2016/0326311 | A1 | 11/2016 | Motoyoshi et al. |
| 2019/0241703 | A1 | 8/2019 | Kato et al. |
| 2020/0181325 | A1 | 6/2020 | Shiratake et al. |
| 2020/0190259 | A1 | 6/2020 | Kato et al. |

FOREIGN PATENT DOCUMENTS

| | | |
|---|---|---|
| EP | 0 242 465 | 10/1987 |
| EP | 0 787 756 | 8/1997 |
| EP | 1 551 900 | 7/2005 |
| EP | 2 034 337 | 3/2009 |
| EP | 3 677 614 | 7/2020 |
| EP | 3 733 734 | 11/2020 |
| JP | 63-63718 | 3/1988 |
| JP | 6-145317 | 5/1994 |
| JP | 6-305044 | 11/1994 |
| JP | 07-198901 | 8/1995 |
| JP | 07-509269 | 10/1995 |
| JP | 8-54615 | 2/1996 |

(Continued)

OTHER PUBLICATIONS

JP2015086265A Translation; Manabu Matsui and Teruyuki Shigematsu; Thermoplastic resin and optical member comprising the same. (Year: 2015).*

International Search Report dated Aug. 21, 2018 in International (PCT) Patent Application No. PCT/JP2018/026613, with translation.

International Search Report dated Oct. 19, 2010 in International (PCT) Application No. PCT/JP2010/062481.

International Preliminary Report on Patentability and Written Opinion dated Feb. 7, 2012 in International (PCT) Application No. PCT/JP2010/062481.

International Search Report dated May 25, 2010 in International (PCT) Application No. PCT/JP2010/053711.

(Continued)

*Primary Examiner* — Terressa Boykin
(74) *Attorney, Agent, or Firm* — Wenderoth, Lind & Ponack, L.L.P.

(57) ABSTRACT

The purpose of the present invention is to provide a thermoplastic resin that has a high refractive index and enables low birefringence and balanced heat resistance and moldability. This thermosetting resin includes repeating units represented by formula (1). (In the formula, the rings Z are the same or different and represent an aromatic hydrocarbon ring, $R^1$ and $R^2$ independently represent a C1-C12 hydrocarbon group optionally including a hydrogen atom, a halogen atom, and an aromatic group, $Ar^1$ and $Ar^2$ represent a C6-C10 aromatic group optionally having a substituent, $L^1$ and $L^2$ independently represent a divalent linking group, j and k independently represent an integer of 0 or more, m and n independently represent 0 or 1, and W is at least one selected from the groups represented by formulae (2) and (3).) (In the formula, X represents a divalent linking group.)

14 Claims, 4 Drawing Sheets

(56) References Cited

FOREIGN PATENT DOCUMENTS

| | | | | |
|---|---|---|---|---|
| JP | 08-311189 | 11/1996 | | |
| JP | 9-268225 | 10/1997 | | |
| JP | 10-7782 | 1/1998 | | |
| JP | 10-87800 | 4/1998 | | |
| JP | 10-101786 | 4/1998 | | |
| JP | 10-120777 | 5/1998 | | |
| JP | 11-269259 | 10/1999 | | |
| JP | 2000-204150 | 7/2000 | | |
| JP | 2000-212271 | 8/2000 | | |
| JP | 2000-219736 | 8/2000 | | |
| JP | 2000-302857 | 10/2000 | | |
| JP | 2001-72872 | 3/2001 | | |
| JP | 2002-284871 | 10/2002 | | |
| JP | 2002-309015 | 10/2002 | | |
| JP | 2002-332345 | 11/2002 | | |
| JP | 2004-67990 | 3/2004 | | |
| JP | 2005-187661 | 7/2005 | | |
| JP | 2005-232252 | 9/2005 | | |
| JP | 2005-241962 | 9/2005 | | |
| JP | 2007-246629 | 9/2007 | | |
| JP | 2009-80424 | 4/2009 | | |
| JP | 2009-249307 | 10/2009 | | |
| JP | 2010-189562 | 9/2010 | | |
| JP | 2010-275412 | 12/2010 | | |
| JP | 2012-155193 | 8/2012 | | |
| JP | 2012-162590 | 8/2012 | | |
| JP | 2013-76982 | 4/2013 | | |
| JP | 2014-38772 | 2/2014 | | |
| JP | 2014-185325 | 10/2014 | | |
| JP | 2014-205829 | 10/2014 | | |
| JP | 2015-086265 | 5/2015 | | |
| JP | 2015086265 | * 5/2015 | ............ | C08G 64/06 |
| JP | 2016-69643 | 5/2016 | | |
| JP | 2017-082038 | 5/2017 | | |
| JP | 2017-171885 | 9/2017 | | |
| JP | 2017-179323 | 10/2017 | | |
| JP | 2017-207759 | 11/2017 | | |
| JP | 2018-2893 | 1/2018 | | |
| JP | 2018-2894 | 1/2018 | | |
| JP | 2018-059074 | 4/2018 | | |
| JP | 2018-177887 | 11/2018 | | |
| WO | 94/02533 | 2/1994 | | |
| WO | 2007/142149 | 12/2007 | | |
| WO | 2009/058396 | 5/2009 | | |
| WO | WO-2009058396 A1 | * 5/2009 | ........... | G02B 5/3083 |
| WO | 2014/073496 | 5/2014 | | |
| WO | 2015/170691 | 11/2015 | | |
| WO | 2017/010318 | 1/2017 | | |
| WO | 2017/146171 | 8/2017 | | |
| WO | 2018/008483 | 1/2018 | | |
| WO | 2018/016516 | 1/2018 | | |
| WO | 2019/044214 | 3/2019 | | |
| WO | 2019/044875 | 3/2019 | | |
| WO | 2019/131841 | 7/2019 | | |

OTHER PUBLICATIONS

International Search Report dated Mar. 31, 2015 in International (PCT) Application No. PCT/JP2015/056272.
Translation of International Preliminary Report on Patentability and Written Opinion of the International Searching Authority dated Sep. 15, 2016 in International (PCT) Application No. PCT/JP2015/056272.
International Search Report dated May 7, 2019 in International (PCT) Application No. PCT/JP2019/011826.
International Search Report dated Jun. 11, 2019 in International (PCT) Application No. PCT/JP2019/009776.
Extended European Search Report dated Jan. 3, 2013 in European Application No. 10802361.5.

* cited by examiner

THERMOPLASTIC RESIN AND OPTICAL MEMBER

FIELD

The present invention relates to a thermoplastic resin that has a high refractive index, and that is able to lower birefringence and to balance heat resistance and moldability.

BACKGROUND

Imaging modules are used in cameras, video cameras, camera-equipped cellular phones, videophones, camera-equipped door phones, and the like. In recent years, downsizing has been a particular requirement for the optical systems used in such imaging modules. However, downsizing of an optical system leads to the major problem of chromatic aberration in the optical system. It is known that chromatic aberration can be compensated for by using a combination of an optical lens material having a high refractive index for the optical lens and a reduced Abbe number for high dispersion, with an optical lens material having a low refractive index and increased Abbe number for low dispersion.

The types of glass conventionally used as materials for optical systems allow the various required optical characteristics to be realized while also having excellent environmental resistance, but their poor workability has been a problem. Therefore, resins that are cheaper than glass materials and have superior workability have come to be used in optical parts. In particular, resins having a fluorene backbone or binaphthalene backbone are used for their high refractive indexes. High refractive index resins with a refractive index of 1.64, using 9,9-bis[4-(2-hydroxyethoxy)phenyl]fluorene, are described in PTLs 1 and 2, for example. However, their refractive indexes are insufficient, and even higher refractive indexes are in demand. PTL 3 describes a thermoplastic resin comprising 9,9-bis[4-(2-hydroxyethoxy)-3-phenylphenyl]fluorene. The resin described in this patent document, however, is also in need of improvement in terms of the refractive index.

CITATION LIST

Patent Literature

[PTL 1] WO2007/142149
[PTL 2] Japanese Unexamined Patent Publication No. H7-198901
[PTL 3] Japanese Unexamined Patent Publication No. 2015-86265

SUMMARY

Technical Problem

It is an object of the present invention to provide a thermoplastic resin that has a high refractive index, and that is able to lower birefringence and to balance heat resistance and moldability.

Solution to Problem

As a result of much diligent research with the aim of achieving this object, the present inventors have devised this invention upon finding that a thermoplastic resin comprising a specific compound with an aromatic group introduced into a fluorene backbone is able to specifically increase the refractive index. The present inventors have also found that with this thermoplastic resin, it is possible to maintain the high refractive index while reducing birefringence and achieving a high balance between heat resistance and moldability.

Specifically, the present invention provides the following.

1. A thermoplastic resin that includes a repeating unit represented by the following formula (1).

[Chemical Formula 1]

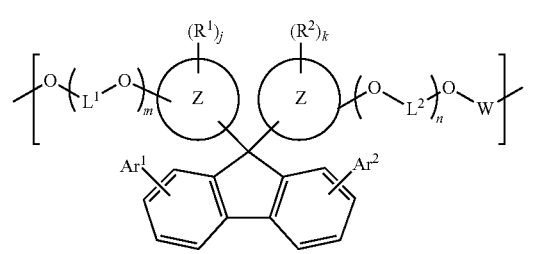

(1)

wherein the rings Z represent (the same or different) aromatic hydrocarbon rings, $R^1$ and $R^2$ each independently represent a hydrogen atom, a halogen atom or a hydrocarbon group of 1 to 12 carbon atoms optionally containing an aromatic group. $Ar^1$ and $Ar^2$ represent an aromatic group of 6 to 10 carbon atoms optionally containing a substituent, $L^1$ and $L^2$ each independently represent a divalent linking group, j and k each independently represent an integer of 0 or greater, m and n each independently represent 0 or 1, and W is at least one group selected from groups represented by the following formula (2) or (3).

[Chemical Formula 2]

(2)

[Chemical Formula 3]

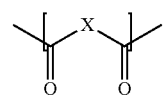

(3)

wherein X represents a divalent linking group.

2. The thermoplastic resin according to 1. above, wherein formula (1) is at least one selected from the group consisting of units represented b the following formulas (1a) to (1d).

[Chemical Formula 4]

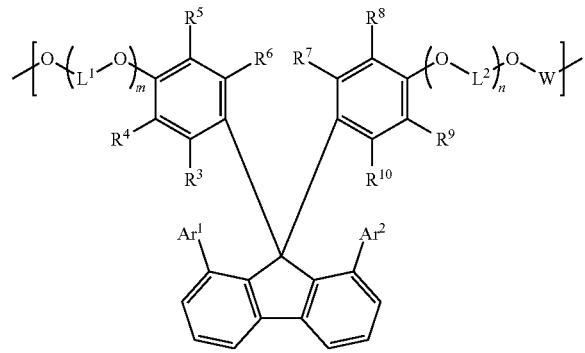

(1a)

[Chemical Formula 5]

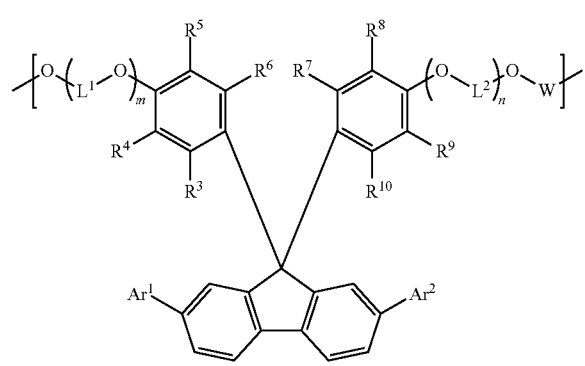

(1b)

[Chemical Formula 6]

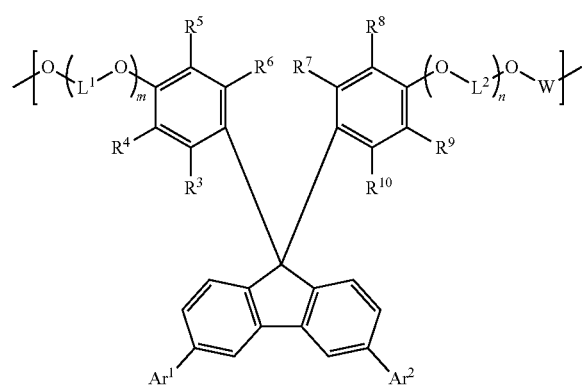

(1c)

[Chemical Formula 7]

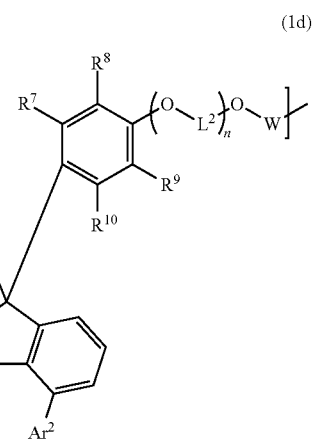

(1d)

wherein $R^3$ to $R^{10}$ each independently represent a hydrogen atom, a halogen atom or a hydrocarbon group of 1 to 12 carbon atoms optionally containing an aromatic group. $Ar^1$ and $Ar^2$, $L^1$ and $L^2$, j and k, m and n and W are the same as in formula (1) above.

3. The thermoplastic resin according to 2. above, wherein formula (1) is at least one selected from the group consisting of units represented by formulas (1b) to (1d) above.

4. The thermoplastic resin according to 2. above, wherein formula (1) is formula (1b).

5. The thermoplastic resin according to any one of 1. to 4. above, wherein $Ar^1$ and $Ar^2$ in formula (1) are phenyl groups.

6. The thermoplastic resin according to any one of 1. to 4. above, wherein $Ar^1$ and $Ar^2$ in formula (1) are naphthyl groups.

7. The thermoplastic resin according to any one of 1. to 6. above, wherein $L^1$ and $L^2$ in formula (1) are ethylene groups, and m and n are 1.

8. The thermoplastic resin according to 4. above, wherein $Ar^1$ and $Ar^2$ in formula (1b) are phenyl groups, $L^1$ and $L^2$ are ethylene groups, m and n are 1, and $R^3$ to $R^{10}$ are hydrogen atoms.

9. The thermoplastic resin according to any one of 1. to 8. above, wherein X in formula (3) includes at least one selected from the group consisting of phenylene group, naphthalenediyl group, groups represented by the following formula (4) and groups represented by the following formula (5), as a repeating unit.

[Chemical Formula 8]

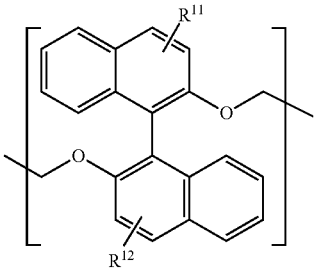

(4)

[Chemical Formula 9]

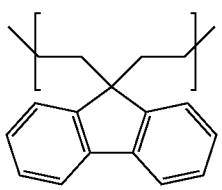

(5)

wherein $R^{11}$ and $R^{12}$ each independently represent a hydrogen atom, a hydrocarbon group of 1 to 12 carbon atoms optionally containing an aromatic group, or a halogen atom.

10. The thermoplastic resin according to any one of 1. to 9. above, which includes at least one selected from the group consisting of units represented by the following formulas (6) to (8), as a repeating unit.

[Chemical Formula 10]

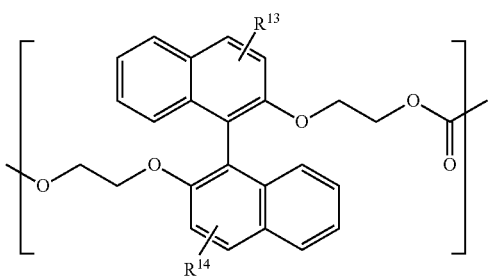

(6)

wherein $R^{13}$ and $R^{14}$ each independently represent a hydrogen atom, a hydrocarbon group of 1 to 12 carbon atoms optionally containing an aromatic group, or a halogen atom.

[Chemical Formula 11]

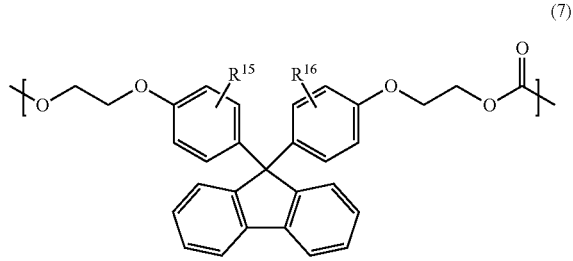

(7)

wherein $R^{15}$ and $R^{16}$ each independently represent a hydrogen atom, a hydrocarbon group of 1 to 12 carbon atoms optionally containing an aromatic group, or a halogen atom.

[Chemical Formula 12]

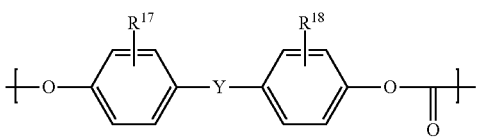

(8)

wherein $R^{17}$ and $R^{18}$ each independently represent a hydrogen atom, a hydrocarbon group of 1 to 12 carbon atoms optionally containing an aromatic group, or a halogen atom, and Y is a single bond or a divalent linking group.

11. The thermoplastic resin according to any one of 1. to 10. above, wherein the relative viscosity is 0.12 to 0.40.
12. The thermoplastic resin according to any one of 1. to 11. above, wherein the glass transition temperature is 140 to 185° C.
13. The thermoplastic resin according to any one of 1. to 12. above, wherein the refractive index is 1.660 to 1.730.
14. An optical member comprising a thermoplastic resin according to any one of 1. to 13. above.
15. The optical member according to 14. above, which is an optical lens.

Advantageous Effects of Invention

The thermoplastic resin of the invention has a high refractive index and is able to lower birefringence and to balance heat resistance and moldability, and it therefore exhibits an exceptional industrial effect.

DESCRIPTION OF EMBODIMENTS

Figure 1:
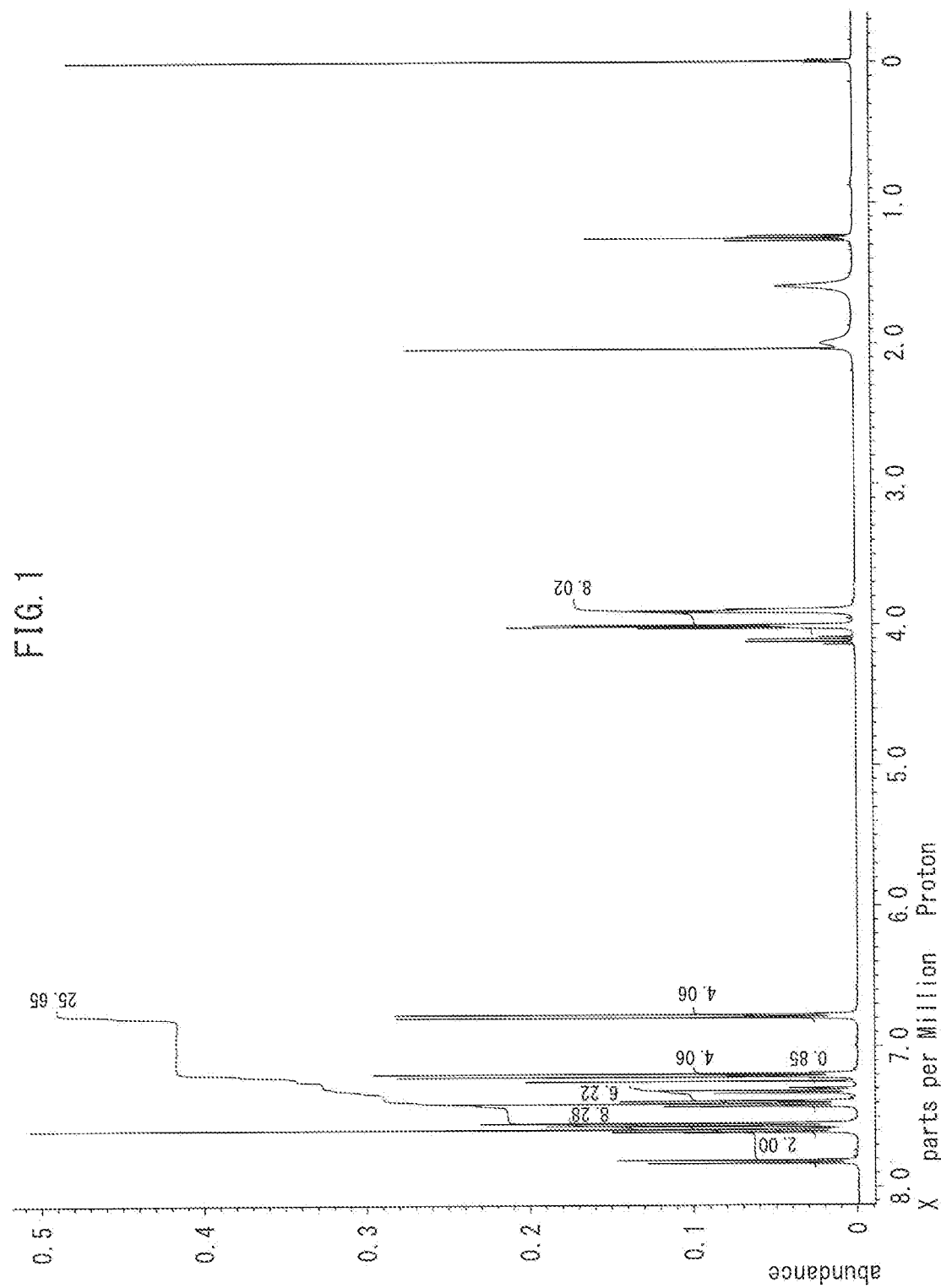
FIG. 1 shows $^1$H NMR of the 9,9-bis[4-(2-hydroxyethoxy)phenyl]-2,7-diphenylfluorene obtained in Reference Example 1.

The present invention will now be explained in greater detail.

<Thermoplastic Resin>

The thermoplastic resin of the invention contains a repeating unit represented by the following formula (1).

[Chemical Formula 13]

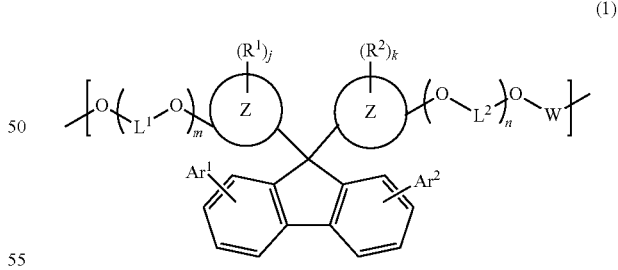

(1)

wherein the rings Z represent the same or different aromatic hydrocarbon rings, $R^1$ and $R^2$ each independently represent a hydrogen atom, a halogen atom or a hydrocarbon group of 1 to 12 carbon atoms optionally containing an aromatic group, $Ar^1$ and $Ar^2$ represent an aromatic group of 6 to 10 carbon atoms optionally containing a substituent, $L^1$ and $L^2$ each independently represent a divalent linking group, j and k each independently represent an integer of 0 or greater, m and n each independently represent 0 or 1, and W is at least one group selected from groups represented by the following formula (2) or (3).

[Chemical Formula 14]

(2)

[Chemical Formula 15]

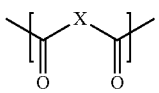
(3)

wherein X represents a divalent linking group.

The aromatic hydrocarbon ring represented by ring Z in formula (1) may be a benzene ring or a fused polycyclic aromatic hydrocarbon ring having at least a benzene ring backbone, with preferred examples being fused bi- to tetracyclic hydrocarbon rings such as fused bicyclic hydrocarbon rings and fused tricyclic hydrocarbon rings.

A fused bicyclic hydrocarbon ring is preferably $C_{8-20}$, such as an indene ring or naphthalene ring, with $C_{10-16}$ fused bicyclic hydrocarbon rings being more preferred. A fused tricyclic hydrocarbon ring is preferably an anthracene ring or phenanthrene ring.

Benzene ring and naphthalene ring are preferred among ring Z, with benzene ring being more preferred.

Specific examples of preferred aromatic hydrocarbon rings represented by ring Z in formula (1) are 1,4-phenylene group, 1,4-naphthalenediyl group and 2,6-naphthalenediyl group, with 1,4-phenylene group being more preferred.

In formula (1), $R^1$ and $R^2$ each independently represent a hydrogen atom, a halogen atom or a hydrocarbon group optionally containing an aromatic group of 1 to 12 carbon atoms, with a hydrogen atom, a methyl group or a phenyl group being preferred.

Examples of hydrocarbon groups represented by $R^1$ and $R^2$ in formula (1) include alkyl groups, cycloalkyl groups, aryl groups, naphthyl groups and aralkyl groups.

Specific preferred examples of alkyl groups include $C_{1-6}$ alkyl groups, $C_{1-4}$ alkyl groups or $C_{1-3}$ alkyl groups such as methyl, ethyl, propyl, isopropyl, butyl and t-butyl groups, with $C_{1-4}$ alkyl groups and $C_{1-3}$ alkyl groups being preferred, $C_{1-3}$ alkyl groups being more preferred and methyl and ethyl groups being even more preferred.

Specific preferred examples of cycloalkyl groups include $C_{5-8}$ cycloalkyl groups and $C_{5-6}$ cycloalkyl groups such as cyclopentyl and cyclohexyl groups, with $C_{5-6}$ cycloalkyl groups being preferred.

Specific preferred examples of aryl groups include phenyl and alkylphenyl groups (such as mono- or dimethylphenyl, tolyl, 2-methylphenyl and xylyl groups), with phenyl group being preferred.

Specific preferred examples of naphthyl groups include 1-naphthyl group and 2-naphthyl group.

Specific preferred examples of aralkyl groups include $C_{6-10}$ aryl-$C_{1-4}$ alkyl groups such as benzyl and phenethyl groups.

Preferred halogen atoms are fluorine, chlorine and bromine.

In formula (1), $Ar^1$ and $Ar^2$ each independently represent an aromatic group of 6 to 10 carbon atoms optionally having a substituent, with optionally substituted phenyl group or naphthyl group being preferred, and phenyl group being more preferred. In the case of a naphthyl group, 1-naphthyl group or 2-naphthyl group is more preferred. The bonding positions of $Ar^1$ and $Ar^2$ are preferably the 1-position and 8-position, the 2-position and 7-position, the 3-position and 6-position or the 4-position and 5-position, more preferably the 2-position and 7-position, the 3-position and 6-position or the 4-position and 5-position, and even more preferably the 2-position and 7-position, of the fluorene backbone.

PTL 3 describes a thermoplastic resin obtained using 9,9-bis[4-(2-hydroxyethoxy)-3-phenylphenyl]fluorene having the following formula (hereunder referred to as "BOPPEF").

[Chemical Formula 16]

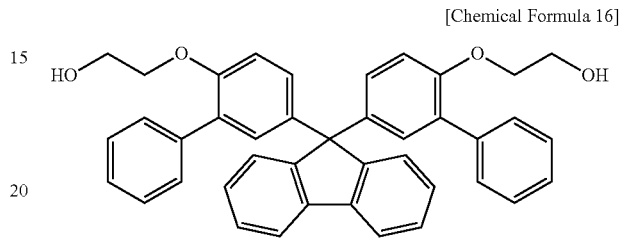

The polymer described in PTL 3 has an aromatic group introduced into the main chain of a fluorene backbone polymer, but the present inventors have found that the refractive index of a polymer having an aromatic group introduced into a side chain of a fluorene backbone polymer is drastically increased compared to the refractive index of the polymer described in PTL 3. In this technical field, a difference of 0.01 in the refractive index is considered to be a very significant difference, and therefore when homopolymers were compared depending on the whether the aromatic group was included in the main chain portion or on a side chain portion, the finding of a difference in refractive index of 0.02 or greater was a very surprising result.

The reason for this is believed to be as follows.

Specifically, based on the relational expression for molecular structure and refractive index, known as the Lorentz-Lorenz formula, it is known that the refractive index of a substance increases by raising the electron density of the molecules and reducing the molecular volume. Based on this theory, resins having fluorene backbones or binaphthalene backbones in the prior art have been given higher refractive indexes by introducing numerous aromatic groups into the molecule. In the polymer of PTL 3, an aromatic group is introduced into the main chain of the polymer of a resin formed from a fluorene backbone, to further increase the refractive index.

As mentioned above, the present invention allows resins with even higher refractive indexes to be obtained, which have not been obtainable in the prior art. While the reason for this is not completely clear, it is possible that the aromatic group introduced into the fluorene backbone has a low degree of freedom of rotation in the molecule, and that the free volume of the polymer having this structure is smaller than a polymer having an aromatic group introduced into the polymer main chain, which is the publicly known technology, and that the refractive index is thereby increased (packing effect). The Abbe number is also reduced in correspondence with the increase in refractive index. When the aromatic groups are in a symmetrical positional relationship with the fluorene backbone, the packing effect is potentially more effective.

The present inventors have also found that, among aromatic groups that are introduced into side chains, naphthyl groups impart an even higher refractive index compared to phenyl groups. The effect of increasing the refractive index was also found to differ significantly depending on the type of naphthyl group (1-naphthyl or 2-naphthyl group). A notable difference in birefringence was also found, depending on the type of naphthyl group (1-naphthyl or 2-naphthyl group). While the reason is not completely understood, it is possible that the overall conjugated state of the side chains containing the fluorene portions differs depending on differences in the bonding positions of the naphthyl groups. That is, presumably the refractive index and birefringence are higher because the conjugated state between 2-naphthyl groups and fluorene portions is more spread out than the conjugated state between 1-naphthyl groups and fluorene portions, and the electron density is higher.

In addition, since it has a fluorene backbone with introduced aromatic groups, the heat resistance can be increased and a balance between birefringence and moldability can be obtained.

In formula (1), $L^1$ and $L^2$ each independently represent a divalent linking group, which is preferably an alkylene group of 1 to 12 carbon atoms, and more preferably an ethylene group. By adjusting the lengths of the linking groups $L^1$ and $L^2$, it is possible to adjust the glass transition temperature of the resin.

In formula (1), W is at least one group selected from groups represented by formula (2) and (3) above. When W is formula (2), formula (1) will be a carbonate unit, and when W is formula (3), formula (1) will be an ester unit.

The repeating unit represented by formula (1) is preferably included at a minimum of 5 mol %, 10 mol % or greater, 20 mol % or greater, 30 mol % or greater, 40 mol % or greater, 50 mol % or greater, 60 mol % or greater or 70 mol % or greater, based on the total repeating units. The repeating unit represented by formula (1) is preferably in this range as the refractive index will be high. It is also preferably included at a maximum of no greater than 100 mol %, no greater than 90 mol %, no greater than 80 mol %, no greater than 70 mol %, no greater than 60 mol %, no greater than 50 mol % or no greater than 40 mol %. If the repeating unit represented by formula (1) is in this range, it will be easier to obtain a resin with a high refractive index, a low birefringence, and balance between heat resistance and moldability.

The thermoplastic resin of the invention is preferably one from among polycarbonate resins, polyester resins and polyester carbonate resins.

In formula (3), X represents a divalent linking group, preferably a hydrocarbon group optionally containing an aromatic group of 1 to 30 carbon atoms, and more preferably phenylene, naphthalenediyl or a group represented by formula (4) or formula (5).

When the thermoplastic resin of the invention includes at least one group selected from the group consisting of units represented by formulas (6) to (8) as a repeating unit, the molar ratio of repeating units, between the repeating unit represented by formula (1) and the group comprising units represented by formulas (6) to (8), is preferably 95:5 to 5:95, and more preferably 90:10 to 10:90, 80:20 to 20:80 or 70:30 to 30:70. If the molar ratio between repeating units represented by formula (1) and at least one repeating unit selected from the group consisting of units represented by formulas (6) to (8) is within this range, it will be easier to obtain a resin with a high refractive index, a low birefringence, and balance between heat resistance and moldability.

In formulas (6) to (8), $R^{13}$ to $R^{18}$ each independently represent a hydrogen atom, a hydrocarbon group of 1 to 12 carbon atoms optionally containing an aromatic group, or a halogen atom, and it may be a hydrogen atom or phenyl group, in particular. Y is a single bond or a divalent linking group, and it may be a divalent hydrocarbon group of 1 to 12 carbon atoms, an oxygen atom or a sulfur atom, for example.

The relative viscosity of the thermoplastic resin of the invention is preferably 0.12 to 0.40, more preferably 0.15 to 0.35 and even more preferably 0.18 to 0.30. The relative viscosity is preferably within this range as the balance between moldability and mechanical strength will be excellent. The relative viscosity was measured as the relative viscosity (risp) at 20° C., using a solution of 0.7 g of the resin obtained upon completion of polymerization, in 100 ml of methylene chloride.

The refractive index of the thermoplastic resin of the invention at a wavelength of 589 nm, measured at 25° C. (hereunder also abbreviated as nD) may be 1.660 or greater, 1.670 or greater, 1.675 or greater, 1.680 or greater, 1.685 or greater, 1.690 or greater, 1.695 or greater, 1.700 or greater or 1.705 or greater, and up to 1.730, up to 1.720, up to 1.710, up to 1.705, up to 1.700, up to 1.695, up to 1.690, up to 1.685 or up to 1.680.

According to one aspect of the invention, the nD of the thermoplastic resin is preferably 1.660 to 1.690, more preferably 1.664 to 1.690, even more preferably 1.670 to 1.690 and most preferably 1.674 to 1.690. If the refractive index is above the lower limit it will be possible to reduce spherical aberration of the lens and to shorten the focal length of the lens.

For the mode in which $Ar^1$ and $Ar^2$ are naphthyl groups, the nD of the thermoplastic resin is preferably 1.660 to 1.730, more preferably 1.670 to 1.720, even more preferably 1.680 to 1.710 and most preferably 1.690 to 1.710.

The thermoplastic resin of the invention has a high refractive index, but it preferably also has a low Abbe number. The Abbe number (v) is preferably 15 to 21, more preferably 15 to 20 and even more preferably 15 to 18. The Abbe number is calculated from the refractive index at wavelengths of 486 nm, 589 nm and 656 nm measured at 25° C., using the following formula.

$$v=(nD-1)/(nF-nC)$$

For the purpose of the invention, the following meanings apply:
nD: Refractive index at a wavelength of 589 nm,
nC: Refractive index at a wavelength of 656 nm,
nF: Refractive index at a wavelength of 486 nm.

The absolute value ($|\Delta n|$) of the orientation birefringence of the thermoplastic resin of the invention is in the range of preferably 0 to $10 \times 10^{-3}$, more preferably 0 to $5 \times 10^{-3}$ and even more preferably 0 to $3 \times 10^{-3}$. The $\Delta n$ value is determined by preparing a film with a thickness of 100 μm from the thermoplastic resin of the invention, stretching it to a factor of 2× at a temperature of Tg+10° C., and then measuring the phase contrast at a wavelength of 59 nm and using the following formula. The value of $|\Delta n|$ is preferably within this range as optical distortion of the lens will be low.

$$|\Delta n|=|Re/d|$$

$\Delta n$: Orientation birefringence
Re: Phase contrast (nm)
d: Thickness (nm)

When the orientation birefringence of a homopolymer is large, then copolymerization between a monomer of the homopolymer and a monomer of a homopolymer having orientation birefringence of the opposite sign can reduce the absolute value of the orientation birefringence.

The thermoplastic resin of the invention has a glass transition temperature (Tg) of preferably 140 to 175° C. or 140 to 185° C., more preferably 150 to 175° C. and even more preferably 155 to 175° C. The glass transition temperature is preferably within this range as the balance between heat resistance and moldability will be excellent.

For the mode in which $Ar^1$ and $Ar^2$ are naphthyl groups, the glass transition temperature (Tg) is preferably 140 to 190° C., more preferably 145 to 180° C. and even more preferably 150 to 160° C.

The thermoplastic resin of the invention has a total light transmittance at 1 mm thickness of preferably 80% or greater, more preferably 85% or greater and even more preferably 88% or greater. If the total light transmittance is within this range it will be suitable as an optical member. Measurement of the total light transmittance was measurement of a 1 mm-thick molded piece using an NDH-300A by Nippon Denshoku Industries Co., Ltd.

The thermoplastic resin of the invention preferably has a light degree of coloration, and particularly yellowishness. Specifically, the b* value in the CIE1976 (L*a*b*) color system is preferably 10.0 or lower. The b* value is more preferably 5.0 or lower and even more preferably 2.0 or lower. The b* value is the value in the CIE1976 (L*a*b*) color system, measured with a spectrophotometer for a solution of 1.0 g dissolved in 5 ml of methylene chloride (a solution dissolved at 13 mass % in methylene chloride).

The thermoplastic resin of the invention has an absorption percentage after immersion at 23° C. for 24 hours, of preferably no greater than 0.25 mass % and more preferably no greater than 0.20 mass %. The absorption percentage is preferably within this range as changes in the optical characteristics due to water absorption will be minimal.

The resistance to moist heat of the thermoplastic resin of the invention can be evaluated by treatment for a prescribed time in an environment of 85° C., 85% relative humidity, and comparing the relative viscosity of the resin before and after treatment. Specifically, the resistance to moist heat can be calculated by the following formula.

Resistance to moist heat (%)=[relative viscosity of resin after treatment]/[relative viscosity of resin before treatment]×100

The resistance to moist heat after 500 hours of treatment is preferably 76% or higher, more preferably 90% or higher and even more preferably 98% or higher.

The specific starting materials used in the thermoplastic resin of the invention will now be described.

<Starting Monomer>
(Diol Component of Formula (1))

The diol component as the starting material of formula (1) for the invention is primarily a diol component represented by formula (a), and a single type may be used alone or two or more different types may be used in combination.

[Chemical Formula 17]

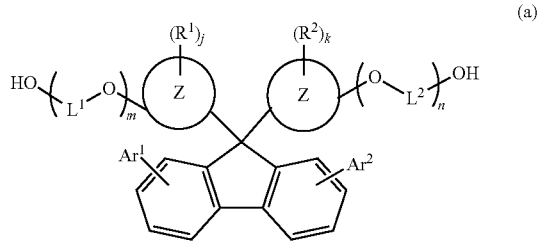

(a)

In formula (a), ring Z, $R^1$ and $R^2$, $Ar^1$ to $Ar^2$, $L^1$ to $L^2$, j, k, m and n are the same as the respective symbols in formula (1).

Specific representative examples of diol components represented by formula (a) will now be listed, with the understanding that the starting materials to be used in formula (1) of the invention are not limited to these.

When $Ar^1$ and $Ar^2$ are phenyl groups, preferred examples include 9,9-bis(4-(2-hydroxyethoxy)phenyl)-1,8-diphenylfluorene, 9,9-bis(4-(2-hydroxyethoxy)-3-methylphenyl)-1,8-diphenylfluorene, 9,9-bis(4-(2-hydroxyethoxy)-3-phenylphenyl)-1,8-diphenylfluorene, 9,9-bis(4-(2-hydroxyethoxy)-1-naphthyl)-1,8-diphenylfluorene, 9,9-bis(6-(2-hydroxyethoxy)-2-naphthyl)-1,8-diphenylfluorene, 9,9-bis(4-hydroxyphenyl)-1,8-diphenylfluorene, 9,9-bis(4-hydroxy-3-methylphenyl)-1,8-diphenylfluorene, 9,9-bis(4-hydroxy-3-phenylphenyl)-1,8-diphenylfluorene, 9,9-bis(4-hydroxy-1-naphthyl)-1,8-diphenylfluorene, 9,9-bis(6-hydroxy-2-naphthyl)-1,8-diphenylfluorene, 9,9-bis(4-(2-hydroxyethoxy)phenyl)-2,7-diphenylfluorene, 9,9-bis(4-(2-hydroxyethoxy)-3-methylphenyl)-2,7-diphenylfluorene, 9,9-bis(4-(2-hydroxyethoxy)-3-phenylphenyl)-2,7-diphenylfluorene, 9,9-bis(4-(2-hydroxyethoxy)-1-naphthyl)-2,7-diphenylfluorene, 9,9-bis(6-(2-hydroxyethoxy)-2-naphthyl)-2,7-diphenylfluorene, 9,9-bis(4-hydroxyphenyl)-2,7-diphenylfluorene, 9,9-bis(4-hydroxy-3-methylphenyl)-2,7-diphenylfluorene, 9,9-bis(4-hydroxy-3-phenylphenyl)-2,7-diphenylfluorene, 9,9-bis(4-hydroxy-1-naphthyl)-2,7-diphenylfluorene, 9,9-bis(6-hydroxy-2-naphthyl)-2,7-diphenylfluorene, 9,9-bis(4-(2-hydroxyethoxy)phenyl)-3,6-diphenylfluorene, 9,9-bis(4-(2-hydroxyethoxy)-3-methylphenyl)-3,6-diphenylfluorene, 9,9-bis(4-(2-hydroxyethoxy)-3-phenylphenyl)-3,6-diphenylfluorene, 9,9-bis(4-(2-hydroxyethoxy)-1-naphthyl)-3,6-diphenylfluorene, 9,9-bis(6-(2-hydroxyethoxy)-2-naphthyl)-3,6-diphenylfluorene, 9,9-bis(4-hydroxyphenyl)-3,6-diphenylfluorene, 9,9-bis(4-hydroxy-3-methylphenyl)-3,6-diphenylfluorene, 9,9-bis(4-hydroxy-3-phenylphenyl)-3,6-diphenylfluorene, 9,9-bis(4-hydroxy-1-naphthyl)-3,6-diphenylfluorene, 9,9-bis(6-hydroxy-2-naphthyl)-3,6-diphenylfluorene, 9,9-bis(4-(2-hydroxyethoxy)phenyl)-4,5-diphenylfluorene, 9,9-bis(4-(2-hydroxyethoxy)-3-methylphenyl)-4,5-diphenylfluorene, 9,9-bis(4-(2-hydroxyethoxy)-3-phenylphenyl)-4,5-diphenylfluorene, 9,9-bis(4-(2-hydroxyethoxy)-1-naphthyl)-4,5-diphenylfluorene, 9,9-bis(6-(2-hydroxyethoxy)-2-naphthyl)-4,5-diphenylfluorene, 9,9-bis(4-hydroxyphenyl)-4,5-diphenylfluorene, 9,9-bis(4-hydroxy-3-methylphenyl)-4,5-diphenylfluorene, 9,9-bis(4-hydroxy-3-phenylphenyl)-4,5-diphenylfluorene, 9,9-bis(4-hydroxy-1-naphthyl)-4,5-diphenylfluorene and 9,9-bis(6-hydroxy-2-naphthyl)-4,5-diphenylfluorene.

More preferred among these are the following formulas (a1) to (a8), specifically the following formula (a1): 9,9-bis(4-(2-hydroxyethoxy)phenyl)-1,8-diphenylfluorene, the following formula (a2): 9,9-bis(4-(2-hydroxyethoxy)phenyl)-2,7-diphenylfluorene (hereunder also referred to as "BPDP2"), the following formula (a3): 9,9-bis(4-(2-hydroxyethoxy)phenyl)-3,6-diphenylfluorene (hereunder also referred to as "BPDP3"), the following formula (a4): 9,9-bis(4-(2-hydroxyethoxy)phenyl)-4,5-diphenylfluorene (hereunder also referred to as "BPDP4"), the following formula (a5): 9,9-bis(4-hydroxyphenyl)-1,8-diphenylfluorene, the following formula (a6): 9,9-bis(4-hydroxyphenyl)-2,7-diphenylfluorene, the following formula (a7): 9,9-bis(4-hydroxyphenyl)-3,6-diphenylfluorene and the following formula (a8): 9,9-bis(4-hydroxyphenyl)-4,5-diphenylfluorene, with the following formula (a2): BPDP2 and the following formula (a6): 9,9-bis(4-hydroxyphenyl)-2,7-diphenylfluorene being particularly preferred.

These may be used alone or in combinations of two or more. Substituents may also be present in the phenyl groups of Ar$^1$ and Ar$^2$.

[Chemical Formula 18]

(a1)
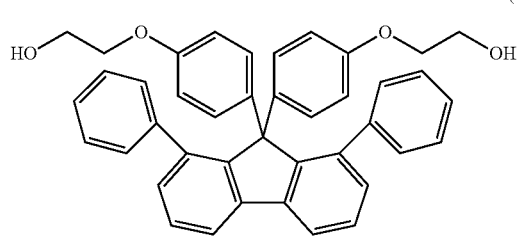

[Chemical Formula 19]

(a2)
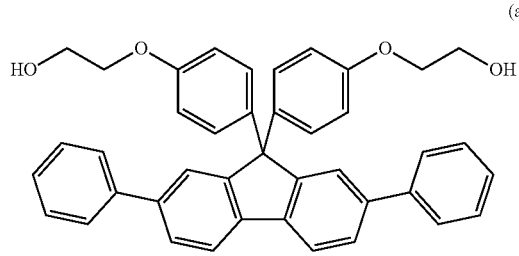

[Chemical Formula 20]

(a3)
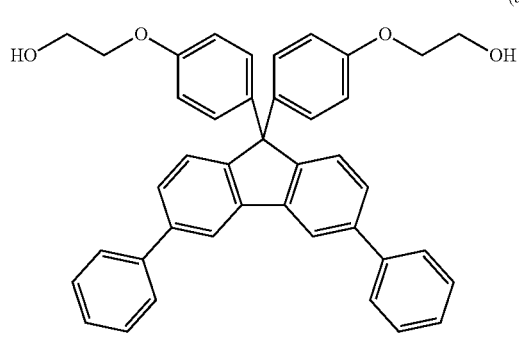

[Chemical Formula 21]

(a4)
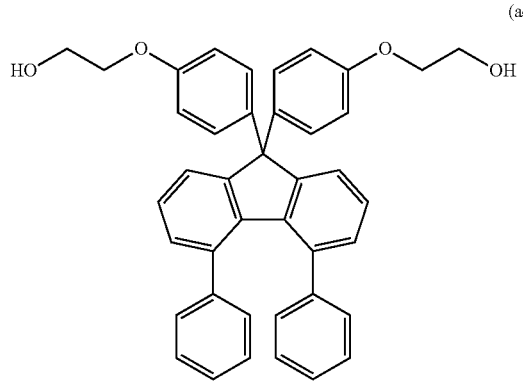

[Chemical Formula 22]

(a5)
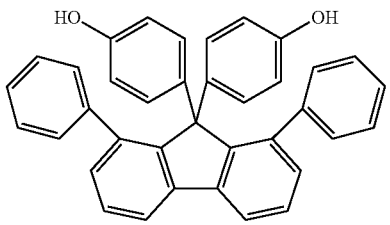

[Chemical Formula 23]

(a6)
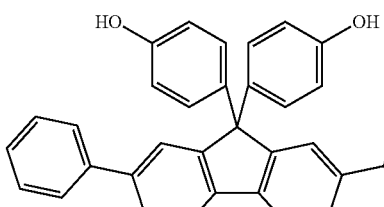

[Chemical Formula 24]

(a7)
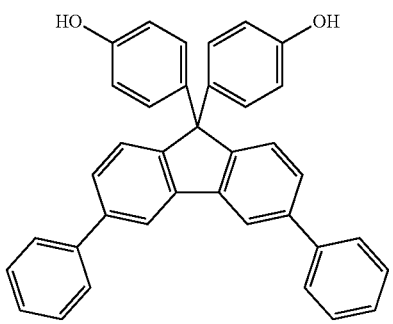

[Chemical Formula 25]

(a8)
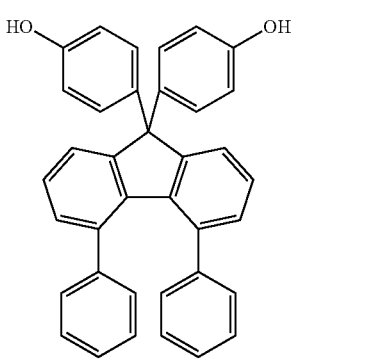

When Ar$^1$ and Ar$^2$ are naphthyl groups, preferred examples include 9,9-bis(4-(2-hydroxyethoxy)phenyl)-1,8-di(1-naphthyl)fluorene, 9,9-bis(4-(2-hydroxyethoxy)-3-methylphenyl)-1,8-di(1-naphthyl)fluorene, 9,9-bis(4-(2-hydroxyethoxy)-3-phenylphenyl)-1,8-di(1-naphthyl)fluorene, 9,9-bis(4-(2-hydroxyethoxy)-1-naphthyl)-1,8-di(1-naphthyl)fluorene, 9,9-bis(6-(2-hydroxyethoxy)-2-naphthyl)-1,8-di(1-naphthyl)fluorene, 9,9-bis(4-hydroxyphenyl)-1,8-di(1-naphthyl)fluorene, 9,9-bis(4-hydroxy-3-methylphenyl)-1,8-di(1-naphthyl)fluorene, 9,9-bis(4-hydroxy-3-phenylphenyl)-1,8-di(1-naphthyl)fluorene, 9,9-bis(4-hydroxy-1-naphthyl)-1,8-di(1-naphthyl)fluorene, 9,9-bis(6-hydroxy-2-naphthyl)-1,8-di(1-naphthyl)fluorene, 9,9-bis(4-(2-hydroxyethoxy)phenyl)-1,8-di(2-naphthyl)fluorene, 9,9- bis(4-(2-hydroxyethoxy)-3-methylphenyl)-1,8-di(2-naphthyl)fluorene, 9,9-bis(4-(2-hydroxyethoxy)-3-phenylphenyl)-1,8-di(2-naphthyl)fluorene, 9,9-bis(4-(2-hydroxyethoxy)-1-naphthyl)-1,8-di(2-naphthyl)fluorene, 9,9-bis(6-(2-hydroxyethoxy)-2-naphthyl)-1,8-di(2-naphthyl)fluorene, 9,9-bis(4-hydroxyphenyl)-1,8-di(2-naphthyl)fluorene, 9,9-bis(4-hydroxy-3-methylphenyl)-1,8-di(2-naphthyl)fluorene, 9,9-bis(4-hydroxy-3-phenylphenyl)-1,8-di(2-naphthyl)fluorene, 9,9-bis(4-hydroxy-1-naphthyl)-1,8-di(2-naphthyl)fluorene, 9,9-bis(6-hydroxy-2-naphthyl)-1,8-di(2-naphthyl)fluorene, 9,9-bis(4-(2-hydroxyethoxy)phenyl)-2,7-di(1-naphthyl)fluorene, 9,9-bis(4-(2-hydroxyethoxy)-3-methylphenyl)-2,7-di(1-naphthyl)fluorene, 9,9-bis(4-(2-hydroxyethoxy)-3-phenylphenyl)-2,7-di(1-naphthyl)fluorene, 9,9-bis(4-(2-hydroxyethoxy)-1-naphthyl)-2,7-di(1-naphthyl)fluorene, 9,9-bis(6-(2-hydroxyethoxy)-2-naphthyl)-2,7-di(1-naphthyl)fluorene, 9,9-bis(4-hydroxyphenyl)-2,7-di(1-naphthyl)fluorene, 9,9-bis(4-hydroxy-3-methylphenyl)-2,7-di(1-naphthyl)fluorene, 9,9-bis(4-hydroxy-3-phenylphenyl)-2,7-di(1-naphthyl)fluorene, 9,9-bis(4-hydroxy-1-naphthyl)-2,7-di(1-naphthyl)fluorene, 9,9-bis(6-hydroxy-2-naphthyl)-2,7-di(1-naphthyl)fluorene, 9,9-bis(4-(2-hydroxyethoxy)phenyl)-2,7-di(2-naphthyl)fluorene, 9,9-bis(4-(2-hydroxyethoxy)-3-methylphenyl)-2,7-di(2-naphthyl)fluorene, 9,9-bis(4-(2-hydroxyethoxy)-3-phenylphenyl)-2,7-di(2-naphthyl)fluorene, 9,9-bis(4-(2-hydroxyethoxy)-1-naphthyl)-2,7-di(2-naphthyl)fluorene, 9,9-bis(6-(2-hydroxyethoxy)-2-naphthyl)-2,7-di(2-naphthyl)fluorene, 9,9-bis(4-hydroxyphenyl)-2,7-di(2-naphthyl)fluorene, 9,9-bis(4-hydroxy-3-methylphenyl)-2,7-di(2-naphthyl)fluorene, 9,9-bis(4-hydroxy-3-phenylphenyl)-2,7-di(2-naphthyl)fluorene, 9,9-bis(4-hydroxy-1-naphthyl)-2,7-di(2-naphthyl)fluorene, 9,9-bis(6-hydroxy-2-naphthyl)-2,7-di(2-naphthyl)fluorene, 9,9-bis(4-(2-hydroxyethoxy)phenyl)-3,6-di(1-naphthyl)fluorene, 9,9-bis(4-(2-hydroxyethoxy)-3-methylphenyl)-3,6-di(1-naphthyl)fluorene, 9,9-bis(4-(2-hydroxyethoxy)-3-phenylphenyl)-3,6-di(1-naphthyl)fluorene, 9,9-bis(4-(2-hydroxyethoxy)-1-naphthyl)-3,6-di(1-naphthyl)fluorene, 9,9-bis(6-(2-hydroxyethoxy)-2-naphthyl)-3,6-di(1-naphthyl)fluorene, 9,9-bis(4-hydroxyphenyl)-3,6-di(1-naphthyl)fluorene, 9,9-bis(4-hydroxy-3-methylphenyl)-3,6-di(1-naphthyl)fluorene, 9,9-bis(4-hydroxy-3-phenylphenyl)-3,6-di(1-naphthyl)fluorene, 9,9-bis(4-hydroxy-1-naphthyl)-3,6-di(1-naphthyl)fluorene, 9,9-bis(6-hydroxy-2-naphthyl)-3,6-di(1-naphthyl)fluorene, 9,9-bis(4-(2-hydroxyethoxy)phenyl)-3,6-di(2-naphthyl)fluorene, 9,9-bis(4-(2-hydroxyethoxy)-3-methylphenyl)-3,6-di(2-naphthyl)fluorene, 9,9-bis(4-(2-hydroxyethoxy)-3-phenylphenyl)-3,6-di(2-naphthyl)fluorene, 9,9-bis(4-(2-hydroxyethoxy)-1-naphthyl)-3,6-di(2-naphthyl)fluorene, 9,9-bis(6-(2-hydroxyethoxy)-2-naphthyl)-3,6-di(2-naphthyl)fluorene, 9,9-bis(4-hydroxyphenyl)-3,6-di(2-naphthyl)fluorene, 9,9-bis(4-hydroxy-3-methylphenyl)-3,6-di(2-naphthyl)fluorene, 9,9-bis(4-hydroxy-3-phenylphenyl)-3,6-di(2-naphthyl)fluorene, 9,9-bis(4-hydroxy-1-naphthyl)-3,6-di(2-naphthyl)fluorene, 9,9-bis(6-hydroxy-2-naphthyl)-3,6-di(2-naphthyl)fluorene, 9,9-bis(4-(2-hydroxyethoxy)phenyl)-4,5-di(1-naphthyl)fluorene, 9,9-bis(4-(2-hydroxyethoxy)-3-methylphenyl)-4,5-di(1-naphthyl)fluorene, 9,9-bis(4-(2-hydroxyethoxy)-3-phenylphenyl)-4,5-di(1-naphthyl)fluorene, 9,9-bis(4-(2-hydroxyethoxy)-1-naphthyl)-4,5-di(1-naphthyl)fluorene, 9,9-bis(6-(2-hydroxyethoxy)-2-naphthyl)-4,5-di(1-naphthyl)fluorene, 9,9-bis(4-hydroxyphenyl)-4,5-di(1-naphthyl)fluorene, 9,9-bis(4-hydroxy-3-methylphenyl)-4,5-di(1-naphthyl)fluorene, 9,9-bis(4-hydroxy-3-phenylphenyl)-4,5-di(1-naphthyl)fluorene, 9,9-bis(4-hydroxy-1-naphthyl)-4,5-di(1-naphthyl)fluorene, 9,9-bis(6-hydroxy-2-naphthyl)-4,5-di(1-naphthyl)fluorene, 9,9-bis(4-(2-hydroxyethoxy)phenyl)-4,5-di(2-naphthyl)fluorene, 9,9-bis(4-(2-hydroxyethoxy)-3-methylphenyl)-4,5-di(2-naphthyl)fluorene, 9,9-bis(4-(2-hydroxyethoxy)-3-phenylphenyl)-4,5-di(2-naphthyl)fluorene, 9,9-bis(4-(2-hydroxyethoxy)-1-naphthyl)-4,5-di(2-naphthyl)fluorene, 9,9-bis(6-(2-hydroxyethoxy)-2-naphthyl)-4,5-di(2-naphthyl)fluorene, 9,9-bis(4-hydroxyphenyl)-4,5-di(2-naphthyl)fluorene, 9,9-bis(4-hydroxy-3-methylphenyl)-4,5-di(2-naphthyl)fluorene, 9,9-bis(4-hydroxy-3-phenylphenyl)-4,5-di(2-naphthyl)fluorene, 9,9-bis(4-hydroxy-1-naphthyl)-4,5-di(2-naphthyl)fluorene and 9,9-bis(6-hydroxy-2-naphthyl)-4,5-di(2-naphthyl)fluorene.

More preferred among these are the following formulas (a9) to (a24), specifically the following formula (a9): 9,9-bis(4-(2-hydroxyethoxy)phenyl)-1,8-di(1-naphthyl)fluorene, the following formula (a10): 9,9-bis(4-(2-hydroxyethoxy)phenyl)-2,7-di(1-naphthyl)fluorene, the following formula (a11): 9,9-bis(4-(2-hydroxyethoxy)phenyl)-3,6-di(1-naphthyl)fluorene, the following formula (a12): 9,9-bis(4-(2-hydroxyethoxy)phenyl)-4,5-di(1-naphthyl)fluorene, the following formula (a13): 9,9-bis(4-hydroxyphenyl)-1,8-di(1-naphthyl)fluorene, the following formula (a14): 9,9-bis(4-hydroxyphenyl)-2,7-di(1-naphthyl)fluorene, the following formula (a15): 9,9-bis(4-hydroxyphenyl)-3,6-di(1-naphthyl)fluorene, the following formula (a16): 9,9-bis(4-hydroxyphenyl)-4,5-di(1-naphthyl)fluorene, the following formula (a17): 9,9-bis(4-(2-hydroxyethoxy)phenyl)-1,8-di(2-naphthyl)fluorene, the following formula (a18): 9,9-bis(4-(2-hydroxyethoxy)phenyl)-2,7-di(2-naphthyl)fluorene, the following formula (a19): 9,9-bis(4-(2-hydroxyethoxy)phenyl)-3,6-di(2-naphthyl)fluorene, the following formula (a20): 9,9-bis(4-(2-hydroxyethoxy)phenyl)-4,5-di(2-naphthyl)fluorene, the following formula (a21): 9,9-bis(4-hydroxyphenyl)-1,8-di(2-naphthyl)fluorene, the following formula (a22): 9,9-bis(4-hydroxyphenyl)-2,7-di(2-naphthyl)fluorene, the following formula (a23): 9,9-bis(4-hydroxyphenyl)-3,6-di(2-naphthyl)fluorene and the following formula (a24): 9,9-bis(4-hydroxyphenyl)-4,5-di(2-naphthyl)fluorene.

Particularly preferred are the following formula (a10): 9,9-bis(4-(2-hydroxyethoxy)phenyl)-2,7-di(1-naphthyl)fluorene (hereunder also referred to as "BPDN1"), the following formula (a14): 9,9-bis(4-hydroxyphenyl)-2,7-di(1-naphthyl)fluorene, the following formula (a18): 9,9-bis(4-(2-hydroxyethoxy)phenyl)-2,7-di(2-naphthyl)fluorene (hereunder also referred to as "BPDN2") and the following formula (a22): 9,9-bis(4-hydroxyphenyl)-2,7-di(2-naphthyl)fluorene.

These may be used alone or in combinations of two or more. Substituents may also be present in the naphthyl groups of $Ar^1$ and $Ar^2$.

[Chemical Formula 26]

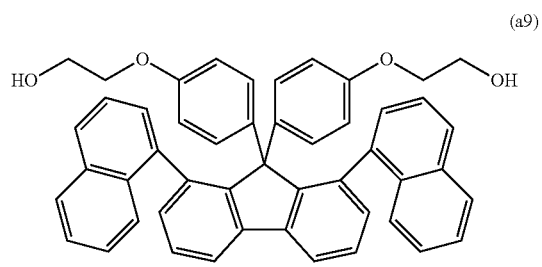

(a9)

[Chemical Formula 27]
(a10)
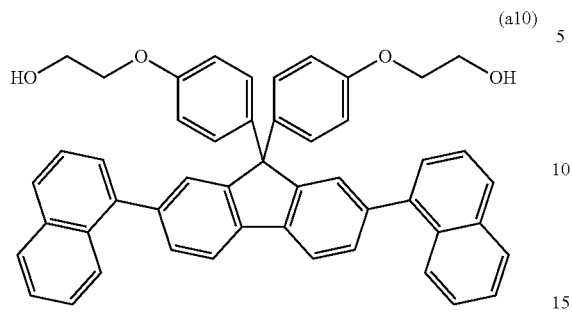
[Chemical Formula 28]
(a11)
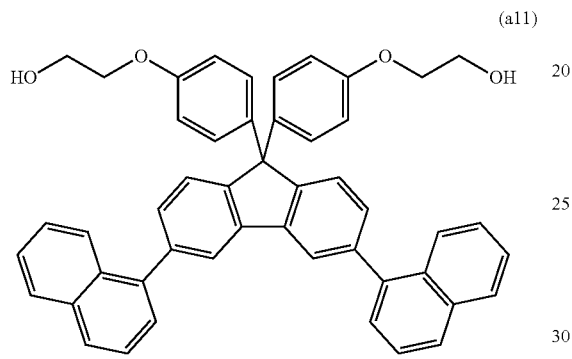
[Chemical Formula 29]
(a12)
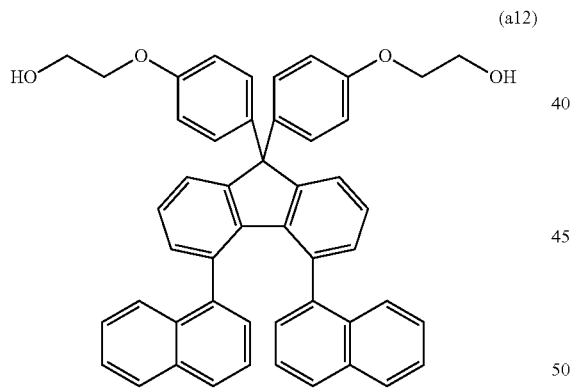
[Chemical Formula 30]
(a13)
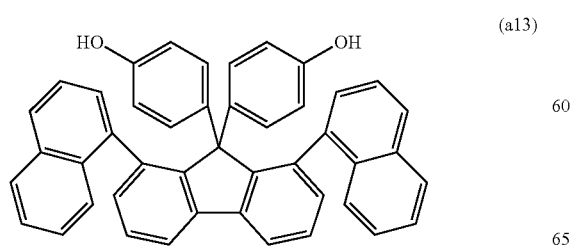
[Chemical Formula 31]
(a14)
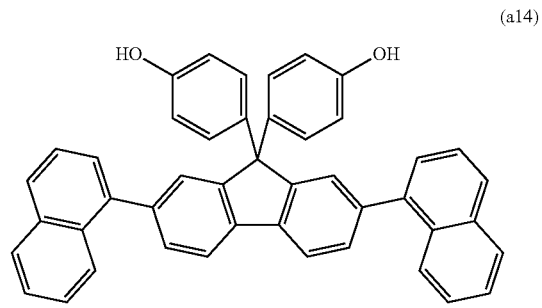
[Chemical Formula 32]
(a15)
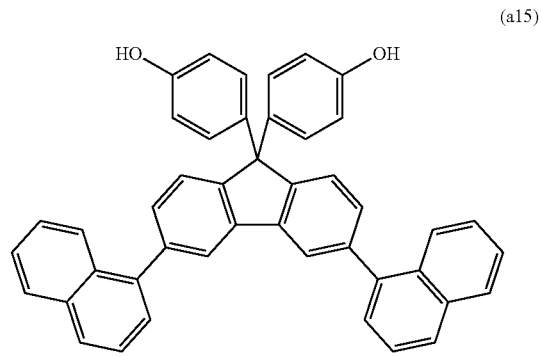
[Chemical Formula 33]
(a16)
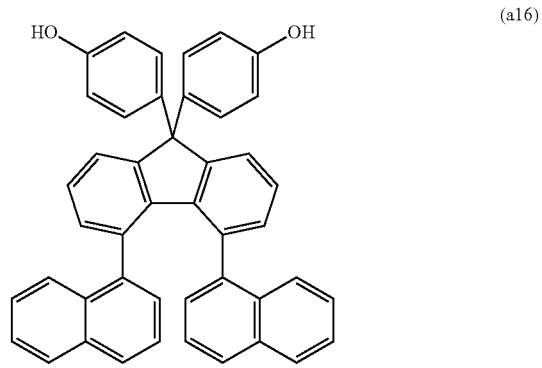
[Chemical Formula 34]
(a17)
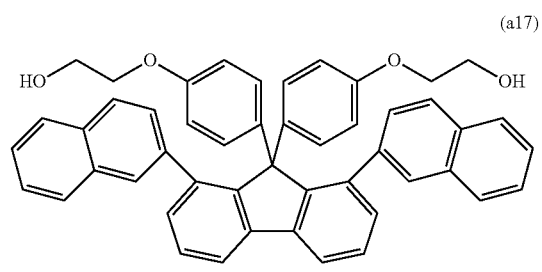

[Chemical Formula 35]

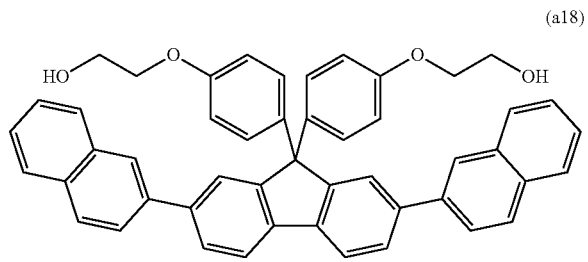

(a18)

[Chemical Formula 36]

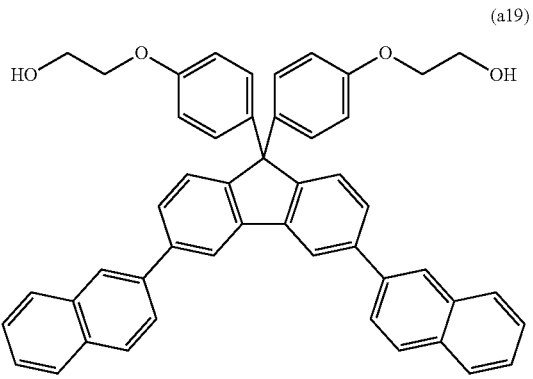

(a19)

[Chemical Formula 37]

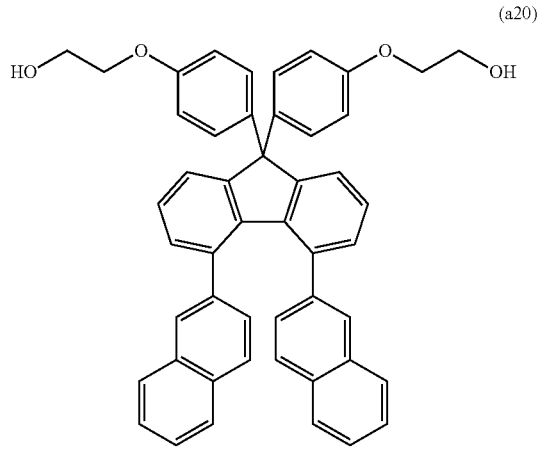

(a20)

[Chemical Formula 38]

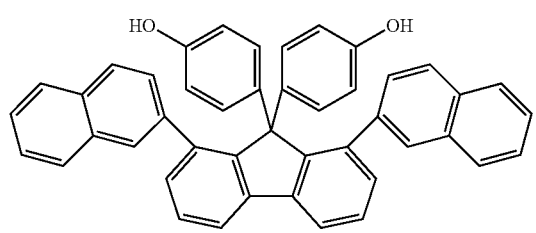

(a21)

[Chemical Formula 39]

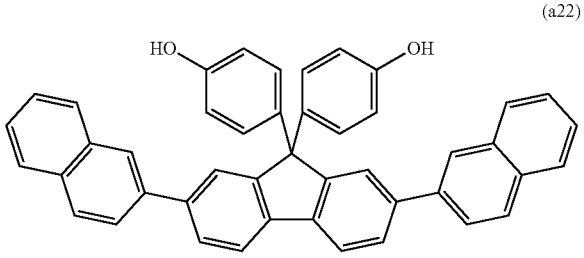

(a22)

[Chemical Formula 40]

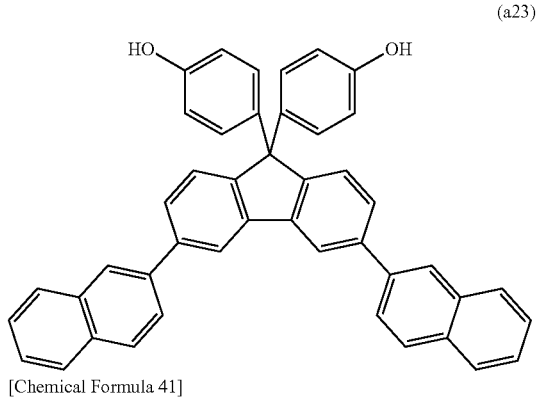

(a23)

[Chemical Formula 41]

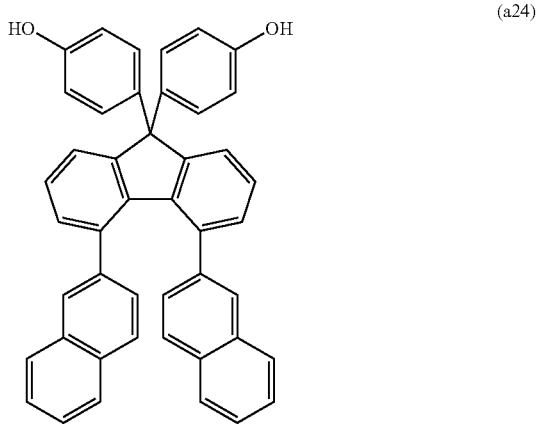

(a24)

(Diol Components of Formulas (6) to (8))

The thermoplastic resin of the invention may also have a repeating unit represented by formulas (6) to (8), the following being diol components as starting materials of formulas (6) to (8). These may be used alone or in combinations of two or more.

Diol components as starting materials of formula (6) for the invention include 2,2'-bis(2-hydroxyethoxy)-3,3'-diphenyl-1,1'-binaphthyl, 2,2'-bis(2-hydroxyethoxy)-6,6'-diphenyl-1,1'-binaphthyl, 2,2'-bis(2-hydroxyethoxy)-7,7'-diphenyl-1,1'-binaphthyl, 2,2'-bis(2-hydroxyethoxy)-3,3'-dimethyl-1,1'-binaphthyl, 2,2'-bis(2-hydroxyethoxy)-6,6'-dimethyl-1,1'-binaphthyl, 2,2'-bis(2-hydroxyethoxy)-7,7'-dimethyl-1,1'-binaphthyl and 2,2'-bis(2-hydroxyethoxy)-1,1'-binaphthyl.

Examples of diol components as starting materials of formula (7) for the invention include 9,9-bis(4-(2-hydroxyethoxy)phenyl)fluorene, 9,9-bis(4-(2-hydroxyethoxy)-3-methylphenyl)fluorene, 9,9-bis(4-(2-hydroxyethoxy)-3-cyclohexylphenyl)fluorene and 9,9-bis(4-(2-hydroxyethoxy)-

3-phenylphenyl)fluorene, with 9,9-bis(4-(2-hydroxyethoxy) phenyl)fluorene and 9,9-bis(4-(2-hydroxyethoxy)-3-phenylphenyl)fluorene being particularly preferred. These may be used alone or in combinations of two or more.

Examples of diol components as starting materials of formula (8) for the invention include 2,2-bis(4-hydroxyphenyl)propane, 2,2-bis(3-methyl-4-hydroxyphenyl)propane, 1,1-bis(4-hydroxyphenyl)-1-phenylethane, 1,3-bis(2-(4-hydroxyphenyl)-2-propyl)benzene, 1,1-bis(4-hydroxyphenyl)-3,3,5-trimethylcyclohexane, 1,1-bis(4-hydroxyphenyl)cyclohexane, bis(4-hydroxyphenyl)diphenylmethane, 1,1-bis(4-hydroxyphenyl)decane, bis(4-hydroxyphenyl)sulfide, bis(4-hydroxy-3-methylphenyl)sulfide, biphenol, 9,9-bis(4-hydroxyphenyl)fluorene, 9,9-bis(4-hydroxy-3-methylphenyl)fluorene, 9,9-bis(4-hydroxy-3-cyclohexylphenyl)fluorene, 9,9-bis(4-hydroxy-3-phenylphenyl)fluorene, bis(4-hydroxyphenyl)sulfone and 10,10-bis(4-hydroxyphenyl)anthrone, with 2,2-bis(4-hydroxyphenyl)propane and bis(4-hydroxyphenyl)sulfide being particularly preferred. These may be used alone or in combinations of two or more.

(Copolymerizing Components Other than Formulas (1) to (8))

The thermoplastic resin of the invention may also have copolymerization of another diol component, to an extent that does not impair the properties according to the invention. The other diol component is preferably present at less than 30 mol % of the total repeating units.

Examples of other diol components to be used in the thermoplastic resin of the invention include ethylene glycol, propanediol, butanediol, pentanediol, hexanediol, heptanediol, octanediol, nonanediol, tricyclo[5.2.1.0$^{2,6}$]decanedimethanol, cyclohexane-1,4-dimethanol, decalin-2,6-dimethanol, norbomanedimethanol, pentacyclopentadecanedimethanol, cyclopentane-1,3-dimethanol, spiroglycol, isosorbide, isomannide, isoizide, hydroquinone, resorcinol, bis(4-(2-hydroxyethoxy)phenyl) sulfone, 1,1'-bi-2-naphthol, dihydroxynaphthalene and bis(2-hydroxyethoxy)naphthalene, any of which may be used alone or in combinations of two or more.

(Dicarboxylic Acid Component of Formula (1))

A dicarboxylic acid component to be used as a unit represented by formula (1) in the thermoplastic resin of the invention is primarily preferred to be a dicarboxylic acid represented by formula (b), or an ester-forming derivative thereof.

[Chemical Formula 42]

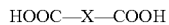

HOOC—X—COOH     (b)

In formula (b), X represents a divalent linking group.

Specific representative examples of dicarboxylic acids or their ester-forming derivatives represented by formula (b) will now be listed, with the understanding that the starting materials to be used in formula (b) of the invention are not limited to these.

Dicarboxylic acid components to be used in the thermoplastic resin of the invention include aliphatic dicarboxylic acid components such as malonic acid, succinic acid, glutaric acid, adipic acid, pimelic acid, suberic acid, azelaic acid, methylmalonic acid and ethylmalonic acid, monocyclic aromatic dicarboxylic acid components such as phthalic acid, isophthalic acid and terephthalic acid, polycyclic aromatic dicarboxylic acid components such as 2,6-naphthalenedicarboxylic acid, 2,7-naphthalenedicarboxylic acid, 2,3-naphthalenedicarboxylic acid, 1,4-naphthalenedicarboxylic acid, 1,8-naphthalenedicarboxylic acid, anthracenedicarboxylic acid, phenanthrenedicarboxylic acid, 2,2'-bis(carboxymethoxy)-1,1'-binaphthyl, 9,9-bis(carboxymethyl)fluorene, 9,9-bis(2-carboxyethyl)fluorene, 9,9-bis(1-carboxyethyl)fluorene, 9,9-bis(1-carboxypropyl)fluorene, 9,9-bis(2-carboxypropyl)fluorene, 9,9-bis(2-carboxy-1-methylethyl)fluorene, 9,9-bis(2-carboxy-1-methylpropyl) fluorene, 9,9-bis(2-carboxybutyl)fluorene, 9,9-bis(2-carboxy-1-methylbutyl)fluorene, 9,9-bis(5-carboxypentyl) fluorene and 9,9-bis(carboxycyclohexyl)fluorene, biphenyldicarboxylic acid components such as 2,2'-biphenyldicarboxylic acid, and alicyclic dicarboxylic acid components such as 1,4-cyclohexanedicarboxylic acid and 2,6-decalindicarboxylic acid, with isophthalic acid, terephthalic acid, 2,6-naphthalenedicarboxylic acid and 2,2'-bis(carboxymethoxy)-1,1'-binaphthyl being preferred. These may be used alone or in combinations of two or more. As ester-forming derivatives there may be used acid chlorides, or esters such as methyl ester, ethyl ester or phenyl ester.

The thermoplastic resin of the invention is produced, for example, by a method of reacting a carbonate precursor such as phosgene or a carbonic acid diester with a diol component, or a method of reacting a dicarboxylic acid or its ester-forming derivative with a diol component. Specific examples are listed below.

<Method for Producing Thermoplastic Resin>

(Method for Producing Polycarbonate Resin)

When the thermoplastic resin of the invention is a polycarbonate resin, it is obtained by reacting a diol component and a carbonate precursor by interfacial polymerization or melt polymerization. A catalyst, end terminator, antioxidant, and the like may also be used as necessary during production of the polycarbonate resin.

Reaction by interfacial polymerization is usually reaction between the diol component and phosgene, the reaction being conducted in the presence of an acid binder and organic solvent. Examples of acid binders that may be used include alkali metal hydroxides such as sodium hydroxide and potassium hydroxide, or amine compounds such as pyridine. Examples of organic solvents that may be used include halogenated hydrocarbons such as methylene chloride and chlorobenzene. A catalyst, for example, a tertiary amine, quaternary ammonium compound or quaternary phosphonium compound such as triethylamine, tetra-n-butylammonium bromide or tetra-n-butylphosphonium bromide, for example, may also be used to promote the reaction. Preferably, the reaction temperature is generally 0 to 40° C. and the reaction time is about 10 minutes to 5 hours, with the pH being kept at 9 or higher during the reaction.

Reaction by melt polymerization is usually transesterification reaction between a diol component and a carbonate ester, and is carried out by a method of heating and mixing the diol component and carbonate ester in the presence of an inert gas and distilling off the generated hydroxy compounds such as phenols. The reaction temperature will differ depending on the diol component used, but will usually be in the range of 120 to 350° C., preferably 150 to 300° C. and more preferably 180 to 270° C. In the latter stage of the reaction, the system is reduced in pressure to about 1000 to 1 Pa to easily distill off the generated hydroxy compounds. The reaction time will usually be about 1 to 8 hours.

Carbonate esters may be esters of optionally substituted aryl or aralkyl groups of 6 to 10 carbon atoms or alkyl groups of C1-4 carbon atoms. Specifically, these include diphenyl carbonate, ditolyl carbonate, bis(chlorophenyl)carbonate, m-cresyl carbonate, dinaphthyl carbonate, bis(diphenyl)carbonate, dimethyl carbonate, diethyl carbonate and dibutyl carbonate, with diphenyl carbonate being preferred.

A polymerization catalyst may also be used to increase the polymerization rate during the melting process, examples of such polymerization catalysts that may be used including catalysts commonly used in esterification reaction and transesterification reaction, for example, alkali metal compounds such as sodium hydroxide, potassium hydroxide and sodium salts and potassium salts of divalent phenols, alkaline earth metal compounds such as calcium hydroxide, barium hydroxide and magnesium hydroxide, nitrogen-containing basic compounds such as tetramethylammonium hydroxide, tetraethylammonium hydroxide, trimethylamine and triethylamine, alkoxides of alkali metals and alkaline earth metals, organic acid salts of alkali metals and alkaline earth metals, zinc compounds, boron compounds, aluminum compounds, silicon compounds, germanium compounds, organic tin compounds, lead compounds, osmium compounds, antimony compounds, manganese compounds, titanium compounds and zirconium compounds. Any of these catalysts may be used alone, or two or more may be used in combination. The amount of such polymerization catalysts used is preferably in the range of $1\times10^{-8}$ to $1\times10^{-3}$ mol with respect to 1 mol of the diol component starting material.

The polycarbonate resin as the thermoplastic resin of the invention may employ a monofunctional hydroxy compound commonly used as an end terminator, for the polymerization reaction. Particularly for reaction using phosgene as the carbonate precursor, it is common to use monofunctional phenols as end terminators for molecular weight modification, and since the obtained polymers have their ends blocked by groups that are based on monofunctional phenols, they have more excellent thermal stability than without using them.

(Method for Producing Polyester Resin)

When the thermoplastic resin of the invention is a polyester resin, the diol component and the dicarboxylic acid or its ester-forming derivative may be reacted by esterification reaction or transesterification, and the obtained reaction product may be subjected to polycondensation reaction to form a polymer of the prescribed molecular weight.

The ethylene glycol component is preferably present at 0 to 50 mol % with respect to the entire diol component. If it is within this range, the balance between beat resistance and moldability will be excellent.

Production may be carried out by selecting a suitable publicly known method, such as direct polymerization, melt polymerization such as transesterification, solution polymerization or interfacial polymerization, as the polymerization method. When interfacial polymerization is used, the method may be one in which a solution of a dicarboxylic acid chloride dissolved in an organic solvent that is immiscible with water (organic phase) is mixed with an aqueous alkali solution containing an aromatic diol and a polymerization catalyst (aqueous phase), and polymerization reaction is conducted while stirring for 0.5 to 8 hours at a temperature of no higher than 50° C. and preferably no higher than 25° C.

The solvent used for the organic phase is preferably a solvent that dissolves the polyester resin of the invention without mixing with water. Examples of such solvents include chlorine-based solvents such as methylene chloride, 1,2-dichloroethane, chloroform and chlorobenzene, and aromatic hydrocarbon-based solvents such as toluene, benzene and xylene, with methylene chloride being preferred for easier use during production.

Examples of aqueous alkali solutions to be used for the aqueous phase include aqueous solutions of sodium hydroxide, potassium hydroxide and sodium carbonate.

Reaction by melt polymerization is usually preferred to be mixture of a diol component and a dicarboxylic acid component or its diester, and reaction at usually 120 to 350° C., preferably 150 to 300° C. and more preferably 180 to 270° C. The pressure reduction is varied in a stepwise fashion, finally distilling off the generated water and hydroxy compounds such as alcohols out of the system at below 0.13 kPa, with a reaction time of usually about 1 to 10 hours.

A transesterification catalyst and a polymerization catalyst may be used to accelerate the polymerization rate in the melting process. A transesterification catalyst that is known may be used, and for example, a compound containing manganese, magnesium, titanium, zinc, aluminum, calcium, cobalt, sodium, lithium or lead element may be used. Specifically, there may be mentioned oxides, acetates, carboxylates, hydrides, alcoholates, halides, carbonates and sulfates containing these elements. From the viewpoint of molten stability, color tone of the thermoplastic resin and low polymer insoluble matter, compounds such as manganese, magnesium, zinc, titanium and cobalt oxides, acetates and alcoholates are preferred. These compounds may be used in combinations of two or more types. A polymerization catalyst that is publicly known may be used, with preferred examples including antimony compounds, titanium compounds, germanium compounds, tin compounds and aluminum compounds. Examples of such compounds include antimony, titanium, germanium, tin and aluminum oxides, acetates, carboxylates, hydrides, alcoholates, halides, carbonates and sulfates. These compounds may also be used in combinations of two or more types. Tin, titanium and germanium compounds are preferred among these from the viewpoint of molten stability and color tone of the thermoplastic resin. The amount of catalyst used is preferably in the range of $1\times10^8$ to $1\times10^{-3}$ mol with respect to 1 mol of the dicarboxylic acid component, for example.

The polyester resin of the invention may also employ an end-capping agent for molecular weight adjustment and increased thermal stability. End-capping agents include monofunctional hydroxy compounds, epoxy compounds, oxazoline compounds, isocyanate compounds, carbodiimide compounds and ketene-imine compounds.

The thermoplastic resin of the invention may also contain a copolymerizing component other than the diol component and the dicarboxylic acid or its ester-forming derivative.

(Method for Producing Polyester Carbonate Resin)

When the thermoplastic resin of the invention is a polyester carbonate resin, it may be produced by reacting a diol component and a dicarboxylic acid or its ester-forming derivative, with phosgene or a carbonate precursor such as a carbonic acid diester. The polymerization method used may be the same method as for a polycarbonate resin or polyester resin.

A transesterification catalyst and a polymerization catalyst may be used to accelerate the polymerization rate in the melting process. A transesterification catalyst that is known may be used, and for example, a compound containing manganese, magnesium, titanium, zinc, aluminum, calcium, cobalt, sodium, lithium or lead element may be used. Specifically, there may be mentioned oxides, acetates, carboxylates, hydrides, alcoholates, halides, carbonates and sulfates containing these elements. From the viewpoint of molten stability, color tone of the thermoplastic resin and low polymer insoluble matter, compounds such as manganese, magnesium, zinc, titanium and cobalt oxides, acetates and alcoholates are preferred. These compounds may be used in combinations of two or more types. A polymerization catalyst that is publicly known may be used, with preferred examples including antimony compounds, titanium compounds, germanium compounds, tin compounds and aluminum compounds. Examples of such compounds include antimony, titanium, germanium, tin and aluminum oxides, acetates, carboxylates, hydrides, alcoholates, halides, carbonates and sulfates. These compounds may also be used in combinations of two or more types. Tin, titanium and germanium compounds are preferred among these from the viewpoint of molten stability and color tone of the thermoplastic resin. The amount of catalyst used is preferably in the range of $1\times10^{-8}$ to $1\times10^{-3}$ mol with respect to 1 mol of the dicarboxylic acid component, for example.

Aluminum or its compound that is preferably used as the catalyst is one that has activity as a catalyst for polymerization of the polyester carbonate resin by transesterification. In particular, it functions as a catalyst for carbonate-forming reaction in polymerization using a diol component, dicarboxylic acid component and carbonate-forming derivative as starting monomers. Preferred examples of aluminum or its compounds include metallic aluminum, aluminum salts, aluminum chelate compounds, organic aluminum compounds and inorganic aluminum compounds. Preferred aluminum salts include organic acid salts and inorganic acid salts of aluminum. Preferred examples of organic acid salts of aluminum include carboxylic acid salts of aluminum, and specifically aluminum formate, aluminum acetate, aluminum propionate, aluminum oxalate, aluminum acrylate, aluminum laurate, aluminum stearate, aluminum benzoate, aluminum trichloroacetate, aluminum lactate, aluminum citrate and aluminum salicylate. Preferred examples of inorganic acid salts of aluminum include aluminum chloride, aluminum hydroxide, aluminum carbonate, aluminum phosphate and aluminum phosphonate. Preferred examples of aluminum chelate compounds include aluminum acetylacetonate, aluminum ethyl acetoacetate and aluminum ethyl acetoacetate di-iso-propoxide.

Preferred examples of organic aluminum compounds include aluminum alkoxides, such as trialkylaluminum, dialkylaluminum alkoxides, alkylaluminum dialkoxides, aluminum trialkoxides, and their hydrolysates, and specifically aluminum alkoxides such as aluminum methoxide, aluminum ethoxide, aluminum n-propoxide, aluminum iso-propoxide, aluminum n-butoxide and aluminum tert-butoxide, trimethylaluminum, triethylaluminum, and their hydrolysates. Preferred inorganic aluminum compounds include aluminum oxide.

Carboxylic acid salts, inorganic acid salts and chelate compounds of aluminum are particularly preferred, among which aluminum acetate, aluminum chloride, aluminum hydroxide, aluminum hydroxide chloride and aluminum acetylacetonate are more especially preferred.

Other compounds may also be used as co-catalysts together with these aluminum compounds, and phosphorus compounds, in particular, are able to increase the catalytic activity of aluminum or its compounds in polymerization reaction of polyester carbonate resins.

Examples of such phosphorus compounds include phosphonic acid-based compounds, phosphinic acid-based compounds, phosphine oxide-based compounds, phosphonous acid-based compounds, phosphinous acid-based compounds and phosphine-based compounds. Particularly preferred among these are phosphonic acid-based compounds, phosphinic acid-based compounds and phosphine oxide-based compounds, with phosphonic acid-based compounds being more especially preferred. Preferred examples of phosphonic acid-based compounds include dimethyl methylphosphonate, diethyl methylphosphonate, dihexyl methylphosphonate, dioctyl methylphosphonate, diphenyl methylphosphonate, dimethyl phenylphosphonate, diethyl phenylphosphonate, dihexyl phenylphosphonate, dioctyl phenylphosphonate, diphenyl phenylphosphonate, dimethyl benzylphosphonate, diethyl benzylphosphonate, dihexyl benzylphosphonate, dioctyl benzylphosphonate, diphenyl benzylphosphonate, dimethyl p-methylbenzylphosphonate, diethyl p-methylbenzylphosphonate, dihexyl p-methylbenzylphosphonate, dioctyl p-methylbenzylphosphonate, diphenyl p-methylbenzylphosphonate, dimethyl 3,5-di-tert-butyl-4-hydroxybenzylphosphonate, diethyl 3,5-di-tert-butyl-4-hydroxybenzylphosphonate, dihexyl 3,5-di-tert-butyl-4-hydroxybenzylphosphonate, dioctyl 3,5-di-tert-butyl-4-hydroxybenzylphosphonate and diphenyl 3,5-di-tert-butyl-4-hydroxybenzylphosphonate, with dimethyl 3,5-di-tert-butyl-4-hydroxybenzylphosphonate, diethyl 3,5-di-tert-butyl-4-hydroxybenzylphosphonate, dihexyl 3,5-di-tert-butyl-4-hydroxybenzylphosphonate, dioctyl 3,5-di-tert-butyl-4-hydroxybenzylphosphonate and diphenyl 3,5-di-tert-butyl-4-hydroxybenzylphosphonate being more preferred. The ratio of phosphorus compound used with respect to the amount of aluminum or its compound that is used is preferably in the range of 0.5 to 10, more preferably in the range of 1 to 5 and even more preferably in the range of 1.5 to 3, as the molar ratio.

The form of the catalyst when used is not particularly restricted, and it may be added to the monomers in the form of a powder, or it may be added to the monomers in the form of a dispersion or solution in a solvent. Also, a pre-mixture of the aluminum or its compound and a phosphorus compound may be added, or the aluminum or its compound and a phosphorus compound may be added separately.

Another diol component-copolymerizing component may also be added, in addition to the diol component and the dicarboxylic acid or its ester-forming derivative.

<Impurities>

(Residual Phenol)

The residual phenol content of the thermoplastic resin of the invention is preferably 1 to 500 ppm, more preferably 1 to 400 ppm and even more preferably 1 to 300 ppm. The phenol content is preferably adjusted by the reaction time at a pressure of below 1.3 kPa. The phenol content increases when reaction is not conducted at a degree of vacuum of below 1.3 kPa. If the reaction time is too long, too much will tend to distill off from the resin.

The phenol content may be adjusted after the thermoplastic resin of the invention has been obtained. For example, it is possible to use a method of dissolving the thermoplastic resin of the invention in an organic solvent and rinsing the organic solvent layer with water, or a method of using a commonly used single-screw or twin-screw extruder or a kneading machine such as any of various types of kneaders, for devolatilization at a pressure of 133 to 13.3 Pa and a temperature of 200 to 320° C. With a suitable residual phenol content, it is possible to increase the molding fluidity without loss of heat resistance. In addition, the thermal stability during hot melting of the resin is also satisfactory, and die contamination during injection molding of the resin can also be prevented. Furthermore, while phenols tend to undergo coloration when oxidized, the color tone of the thermoplastic resin is less likely to be impaired and the molding fluidity is also satisfactory within this range.

(Residual Fluorenone)

The residual fluorenone content of the thermoplastic resin of the invention is preferably 1 to 500 ppm, more preferably 1 to 300 ppm, even more preferably 1 to 100 ppm and most preferably 1 to 50 ppm. If the residual fluorenone content in the thermoplastic resin of the invention is suitable it will be possible to prevent coloration of the resin.

(Residual Palladium Catalyst)

The amount of residual palladium catalyst in the thermoplastic resin of the invention is preferably no greater than 10 ppm, and more preferably no greater than 5.0 ppm, no greater than 3.0 ppm, no greater than 1.0 ppm or 0.5 ppm, and it may also be 0.0 ppm or greater, 0.1 ppm or greater, 0.2 ppm or greater or 0.5 ppm or greater. If the amount of residual palladium in the thermoplastic resin of the invention is suitable it will be possible to prevent coloration of the resin.

<Additives>

Additives such as release agents, heat stabilizers, ultraviolet absorbers, blueing agents, antistatic agents, flame retardants, plasticizers and fillers may also be appropriately added to the thermoplastic resin of the invention as necessary.

Specific release agents and heat stabilizers that are preferred include those mentioned in International Patent Publication No. 2011/010741.

Particularly preferred release agents to be used are monoglyceride stearate, triglyceride stearate, pentaerythritol tetrastearate, and triglyceride stearate and stearyl stearate mixture. The amount of ester in the release agent is preferably 90 wt % or greater and more preferably 95 wt % or greater, where the release agent is 100 wt %. The release agent is added to the thermoplastic resin composition preferably in the range of 0.005 to 2.0 parts by weight, more preferably in the range of 0.01 to 0.6 part by weight and even more preferably in the range of 0.02 to 0.5 part by weight, with respect to 100 parts by weight of the thermoplastic resin.

Heat stabilizers include phosphorus-based heat stabilizers, sulfur-based heat stabilizers and hindered phenol-based heat stabilizers.

Particularly preferred phosphorus-based heat stabilizers for use are tris(2,4-di-tert-butylphenyl)phosphite, bis(2,6-di-tert-butyl-4-methylphenyl)pentaerythritol diphosphite and tetrakis(2,4-di-tert-butylphenyl)-4,4'-biphenylene diphosphonite. The content of the phosphorus-based heat stabilizer in the thermoplastic resin is preferably 0.001 to 0.2 part by weight with respect to 100 parts by weight of the thermoplastic resin.

A particularly preferred sulfur-based heat stabilizer is pentaerythritol-tetrakis(3-laurylthiopropionate). The content of the sulfur-based heat stabilizer in the thermoplastic resin is preferably 0.001 to 0.2 part by weight with respect to 100 parts by weight of the thermoplastic resin.

Preferred hindered phenol-based heat stabilizers are octadecyl-3-(3,5-di-tert-butyl-4-hydroxyphenyl)propionate and pentaerythritol-tetrakis[3-(3,5-di-tert-butyl-4-hydroxyphenyl)propionate].

The content of the hindered phenol-based heat stabilizer in the thermoplastic resin is preferably 0.001 to 0.3 part by weight with respect to 100 parts by weight of the thermoplastic resin.

A phosphorus-based heat stabilizer and a hindered phenol-based heat stabilizer may also be used in combination.

The ultraviolet absorber is preferably at least one type of ultraviolet absorber selected from the group consisting of benzotriazole-based ultraviolet absorbers, benzophenone-based ultraviolet absorbers, triazine-based ultraviolet absorbers, cyclic imino ester-based ultraviolet absorbers and cyano acrylate-based compounds.

More preferred benzotriazole-based ultraviolet absorbers are 2-(2-hydroxy-5-tert-octylphenyl)benzotriazole and 2,2'-methylenebis[4-(1,1,3,3-tetramethylbutyl)-6-(2H-benzotriazol-2-yl)phenol].

Benzophenone-based ultraviolet absorbers include 2-hydroxy-4-n-dodecyloxybenzophenone and 2-hydroxy-4-methoxy-2'-carboxybenzophenone.

Triazine-based ultraviolet absorbers include 2-(4,6-diphenyl-1,3,5-triazin-2-yl)-5-[(hexyl)oxy]-phenol and 2-(4,6-bis(2.4-dimethylphenyl)-1,3,5-triazin-2-yl)-5-[(octyl)oxy]-phenol.

A particularly suitable cyclic imino ester-based ultraviolet absorber is 2,2'-p-phenylenebis(3,1-benzoxazin-4-one).

Cyano acrylate-based ultraviolet absorbers include 1,3-bis-[(2'-cyano-3',3'-diphenylacryloyl)oxy]-2,2-bis[(2-cyano-3,3-diphenylacryloyl)oxy]methyl)propane and 1,3-bis-[(2-cyano-3,3-diphenylacryloyl)oxy]benzene.

The content of the ultraviolet absorber is preferably 0.01 to 3.0 parts by weight with respect to 100 parts by weight of the thermoplastic resin, as a content within this range can impart sufficient weather resistance to the thermoplastic resin molded article, according to the purpose of use.

Blueing agents include MACROLEX Violet B and MACROLEX Blue RR by Bayer Ltd., and Polysynthren Blue RLS by Clariant Japan. A blueing agent is effective for eliminating yellowishness of the thermoplastic resin. Particularly in the case of a thermoplastic resin composition that has been given weather resistance, addition of an ultraviolet absorber in a fixed amount currently tends to produce a yellowish color in the resin composition by the "action and color of the ultraviolet absorber", and therefore addition of a blueing agent is highly effective for imparting natural transparency to lenses.

The blueing agent content is preferably 0.05 to 1.5 ppm and more preferably 0.1 to 1.2 ppm with respect to 100 parts by weight of the thermoplastic resin.

<Optical Lens>

The thermoplastic resin of the invention is suitable as an optical member, and particularly as an optical lens.

When an optical lens is to be produced from the thermoplastic resin of the invention by injection molding, molding is preferably carried out under conditions with a cylinder temperature of 230 to 350° C. and a mold temperature of 70 to 180° C. More preferably, molding is carried out under conditions with a cylinder temperature of 250 to 300° C. and a mold temperature of 80 to 170° C. When the cylinder temperature is higher than 350° C. the thermoplastic resin tends to decompose and undergo coloration, and when it is lower than 230° C. the melt viscosity increases, tending to hamper molding. Also, when the mold temperature is higher than 180° C., it tends to become difficult to remove molded pieces composed of the thermoplastic resin from the die. When the mold temperature is below 70° C., on the other hand, the resin hardens too quickly inside the die during molding, making it difficult for the molded piece shape to be controlled and tending to make it difficult for the mold shape of the die to be transferred.

It is preferred to use an aspherical lens shape, as necessary, for an optical lens of the invention. An aspherical lens allows spherical aberration to be reduced to essentially zero with a single lens, thus making it unnecessary to eliminate spherical aberration by a combination of multiple spherical lenses, and allowing the weight to be reduced and the molding cost to be reduced. Therefore, an aspherical lens is useful among optical lenses, particularly as a camera lens.

In addition, because of its high molding fluidity, the thermoplastic resin of the invention is particularly useful as a material for optical lenses having thin, small complex shapes. Specifically, the lens size is such that the center section thickness is 0.05 to 3.0 mm, more preferably 0.05 to 2.0 mm and even more preferably 0.1 to 2.0 mm. The diameter is 1.0 mm to 20.0 mm, more preferably 1.0 to 10.0 mm and more preferably 3.0 to 10.0 mm. A meniscus lens is preferred, having a shape which is convex on one side and concave on the other side.

A lens made of a thermoplastic resin in an optical lens of the invention is molded by any desired method such as die molding, shaving, polishing, laser working, electrical discharge machining or etching. Die molding is more preferred among these, from the viewpoint of production cost.

EXAMPLES

The invention will now be described in greater detail by examples, with the understanding that the invention is not limited thereto.

(a) Film

After dissolving 3 g of an obtained resin in 50 ml of methylene chloride, the solution was cast onto a glass dish. After thoroughly drying at room temperature, it was dried for 8 hours at a temperature of no higher than 120° C. to prepare a film with a thickness of approximately 100 μm.

Evaluation was performed by the following method, using the obtained resin in (1) to (3), and the film prepared by the aforementioned method in (4) and (5).

(1) Copolymerization ratio: This was determined by measuring the $^1$H NMR of the resin obtained after completion of polymerization, using a JNM-ECZ400S/L1 by JEOL Corp.

(2) Relative viscosity: This was measured as the relative viscosity ($\eta_{sp}$) at 20° C., using a solution obtained by thoroughly drying the resin obtained upon completion of polymerization and dissolving 0.7 g of the resin in 100 ml of methylene chloride.

(3) Glass transition temperature (Tg): This was measured using the resin obtained after melt kneading, with a DSC-60A by Shimadzu Corp. at a temperature-elevating rate of 20° C./min.

(4) Refractive index (nD): The refractive index at 25° C. (wavelength: 589 nm) and the Abbe number (calculated from the refractive index at wavelengths of 486 nm, 589 nm and 656 nm, using the following formula) of a film prepared by the method of (a) were measured using a DR-M2 Abbe refractometer by Atago.

$$\nu=(nD-1)/(nF-nC)$$

For the purpose of the invention, the following meanings apply:

nD: Refractive index at a wavelength of 589 nm,
nC: Refractive index at a wavelength of 656 nm,
nF: Refractive index at a wavelength of 486 nm.

(5) Absolute value of orientation birefringence (|Δn|): A cast film with a thickness of 100 μm, prepared by the method of (a), was stretched to a factor of 2× at Tg+10° C., the phase contrast (Re) at 589 nm was measured using an M-220 ellipsometer by JASCO Corp., and the absolute value of the orientation birefringence was determined by the following formula.

$$|\Delta n|=|Re/d|$$

Δn: Orientation birefringence
Re: Phase contrast (nm)
d: Thickness (nm)

Experiment 1: Examining Thermoplastic Resin with Ar$^1$ and Ar$^2$ as Phenyl Groups Reference Example 1 (Synthesis of 9,9-bis(4-(2-hydroxyethoxy)phenyl)-2,7-diphenylfluorene (BPDP2))

(1-1) Synthesis of 2,7-diphenylfluorenone

After dissolving 25.0 g of 2,7-dibromofluorenone and 22.5 g of phenylboronic acid in a toluene/ethanol mixed solvent (mixing ratio 4:1), in a 3 L three-necked flask equipped with a stirrer, cooler and thermometer, 1.7 g of tetrakis(triphenylphosphine)palladium and 85 mL of a 2 M potassium carbonate aqueous solution were added, and then reaction was carried out by stirring at 76° C. for 2 hours. Progression of the reaction was confirmed by HPLC, and reaction was completed upon confirming a residual 2,7-dibromofluorenone amount of 0.1% or lower.

The obtained reaction mixture was concentrated under reduced pressure and the toluene/ethanol was removed, after which a 1 M sodium hydroxide aqueous solution was added to the residue and the chloroform was extracted. The organic layer was concentrated and recrystallized, and the deposited crystals were filtered out and dried at 85° C. for 24 hours to obtain 29.5 g of yellow crystals of the target substance, 2,7-diphenylfluorenone, at a 92% yield.

(1-2) Synthesis of 9,9-bis(4-hydroxyphenyl)-2,7-diphenylfluorene

After adding 21.0 g of 2,7-diphenylfluorenone, 1.0 g of 3-mercaptopropionic acid, 105.0 g of phenol, 2.1 g of toluene and 4.2 g of concentrated sulfuric acid to a 300 mL three-necked flask equipped with a stirrer, cooler and thermometer, reaction was carried out by stirring at 55° C. for 1 hour. Progression of the reaction was confirmed by HPLC, and reaction was completed upon confirming a residual 2,7-diphenylfluorenone amount of 0.1% or lower.

Acetone was added to the obtained reaction mixture, and dropwise addition of the obtained mixture into a potassium carbonate aqueous solution resulted in precipitation of a white solid, the white solid being subsequently filtered out. This procedure was repeated 4 times, and the obtained white solid was dried under reduced pressure at 60° C. for 24 hours to obtain 33.2 g of a white solid of the target substance, 9,9-bis(4-hydroxyphenyl)-2,7-diphenylfluorene, at a 98% yield.

(1-3) Synthesis of BPDP2

After dissolving 44.0 g of 9,9-bis(4-hydroxyphenyl)-2,7-diphenylfluorene, 31.5 g of potassium carbonate and 32.8 g of 2-bromoethanol in 440 mL of DMF in a 1 L separable flask equipped with a stirrer, cooler and thermometer, under a nitrogen atmosphere, reaction was carried out by stirring at 120° C. for 3 hours.

The reaction mixture was then cooled to room temperature, 12.0 g of potassium carbonate and 12.0 g of 2-bromoethanol were further added, and reaction was continued by stirring at 120° C. for 3 hours. This procedure was repeated twice, and reaction was completed upon confirming residue of 9,9-bis(4-hydroxyphenyl)-2,7-diphenylfluorene in an amount of no greater than 0.1% using HPLC.

After restoring the obtained reaction mixture to room temperature, dropwise addition to 4.4 L of a 1 M sodium hydroxide aqueous solution produced a white solid, the white solid subsequently being filtered out. The obtained solid was purified with a silica gel column using an ethyl acetate/hexane (1/2) eluent, to obtain 36 g of a white solid of the target substance, BPDP2, at a 70% yield and 98% purity. The obtained white solid was analyzed by $^1$H NMR and confirmed to be the target substance (FIG. 1).

The HPLC measurement was carried out with column: ACQUITY UPLC BEH C18 1.7 μm (by Waters Corp.), solvent: N,N-dimethylformamide and 0.15% trifluoroacetic acid/ultrapure water 7:3 mixed solution, detector: UV-270 nm, at a flow rate of 1 mL/min.

Reference Example 2 (Synthesis of 9,9-bis(4-(2-hydroxyethoxy)phenyl)-3,6-diphenylfluorene (BPDP3))

The compound 3,6-diphenylfluorenone was obtained by the same method as in 1-1 above, except for changing 2,7-dibromofluorenone to 3,6-dibromofluorenone. Next, 9,9-bis(4-hydroxyphenyl)-3,6-diphenylfluorene was obtained by the same method as in 1-2 above, except for changing 2,7-diphenylfluorenone to 3,6-diphenylfluorenone. The target substance BPDP3 was then obtained by the same method as in 1-3 above, except for changing 9,9-bis(4-hydroxyphenyl)-2,7-diphenylfluorene to 9,9-bis(4-hydroxyphenyl)-3,6-diphenylfluorene.

Reference Example 3 (Synthesis of 9,9-bis(4-(2-hydroxyethoxy)phenyl)-4,5-diphenylfluorene (BPDP4))

The compound 4,5-diphenylfluorenone was obtained by the same method as in 1-above, except for changing 2,7-dibromofluorenone to 4,5-dibromofluorenone. Next, 9,9-bis(4-hydroxyphenyl)-4,5-diphenylfluorene was obtained by the same method as in 1-2 above, except for changing 2,7-diphenylfluorenone to 4,5-diphenylfluorenone. The target substance BPDP4 was then obtained by the same method as in 1-3 above, except for changing 9,9-bis(4-hydroxyphenyl)-2,7-diphenylfluorene to 9,9-bis(4-hydroxyphenyl)-4,5-diphenylfluorene.

Example 1

Figure 2:
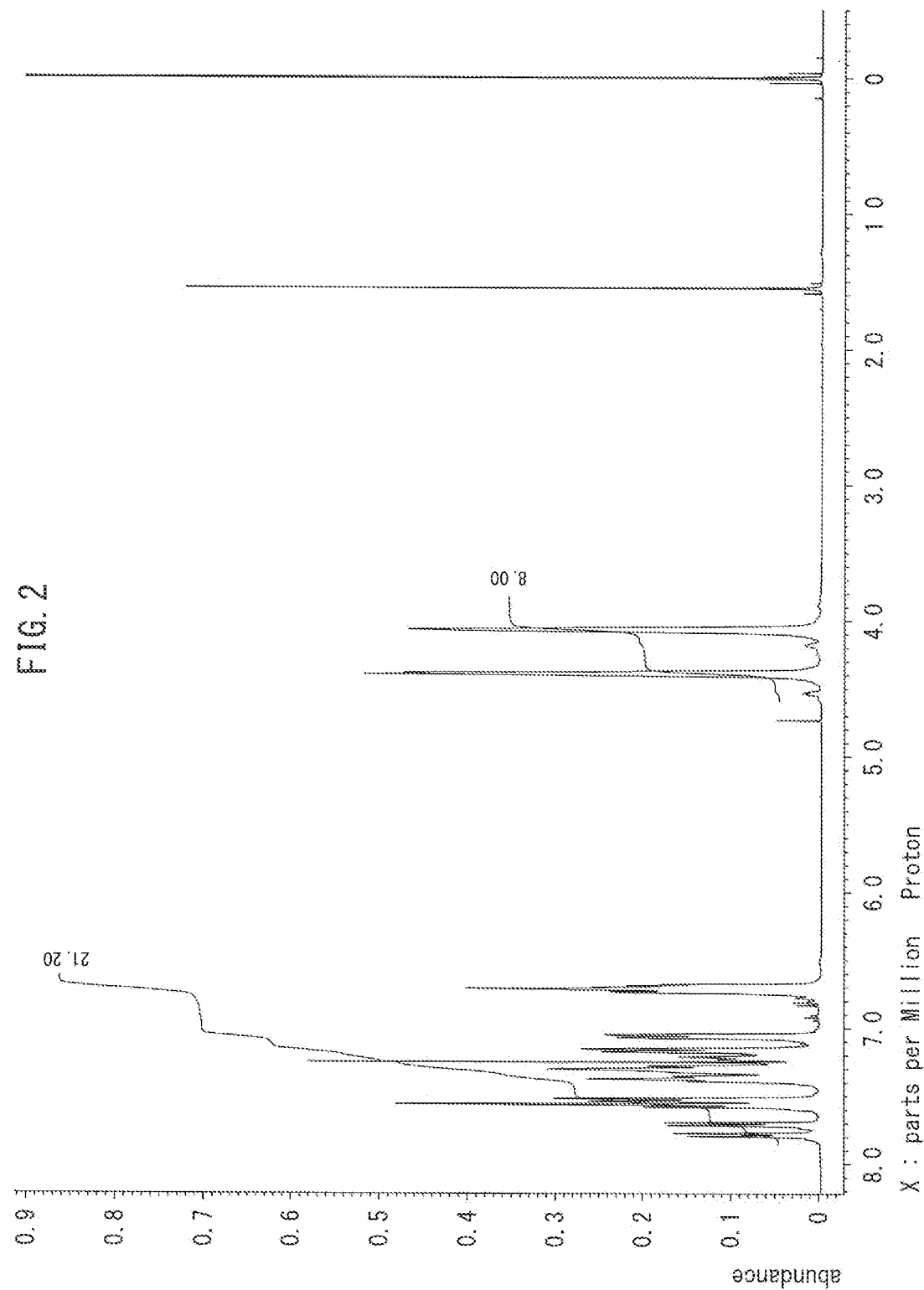
FIG. 2 shows the $^1$H NMR of the polycarbonate resin obtained in Example 1.

After placing 29.51 parts by mass of the BPDP2 synthesized in Reference Example 1, 21.93 parts by mass of 9,9-bis[4-(2-hydroxyethoxy)phenyl]fluorene (hereunder also abbreviated as BPEF), 21.64 parts by mass of diphenyl carbonate (hereunder also abbreviated as DPC) and 42.0×10$^{-5}$ parts by mass of sodium hydrogencarbonate in a reaction kiln equipped with a stirrer and distillation device, nitrogen exchange was carried out 3 times, and the jacket was heated to 180° C. to melt the starting materials. After complete dissolution, the pressure was reduced to 20 kPa over a period of 5 minutes while simultaneously increasing the temperature of the jacket to 260° C. at a rate of 60° C./hr, for transesterification reaction. Next, the jacket was kept at 260° C. while reducing the pressure to 0.13 kPa over a period of 50 minutes, and polymerization reaction was carried out under conditions of 260° C., ≤0.13 kPa until a prescribed torque was reached. Upon completion of the reaction, the produced resin was extracted while being pelletized, to obtain polycarbonate resin pellets. The obtained polycarbonate resin was analyzed by $^1$H NMR, confirming that the BPDP2 component had been introduced at 50 mol % with respect to the total monomer component (FIG. 2). The relative viscosity of the obtained polycarbonate resin was 0.22, the refractive index was 1.664, the Abbe number was 18, the Tg was 161° C. and the absolute value of the orientation birefringence was $4.8 \times 10^{-3}$.

After drying the obtained resin at 120° C. for 4 hours, 0.05 wt % of bis(2,6-di-tert-butyl-4-methylphenyl)pentaerythritol diphosphite and 0.10 wt % of glycerin monostearate were added, based on the weight of the resin, and a vented φ15 mm twin-screw extruder was used for pelletizing. After drying the pellets at 120° C. for 4 hours, they were subjected to injection molding at a cylinder temperature of 280° C. and a mold temperature of 130° C., to obtain a lens with a thickness of 0.3 mm, a convex curvature radius of 5 mm and a concave curvature radius of 4 mm.

Example 2

Pellets of a polycarbonate resin with 100% BPDP2 component were obtained by the same method as Example 1, except for using 59.03 parts by mass of the BPDP2 of Example 1 and 0 parts by mass of BPEF. The relative viscosity of the obtained polycarbonate resin was 0.20, the refractive index was 1.683, the Abbe number was 15, the Tg was 175° C. and the absolute value of the orientation birefringence was $8.5 \times 10^{-3}$.

Example 3

Pellets of a polycarbonate resin were obtained by the same method as Example 1, except for using 29.51 parts by mass of the BPDP2 of Example 1 and changing BPEF to 2,2'-bis(2-hydroxyethoxy)-1,1'-binaphthyl (hereunder also abbreviated as BHEB), at 18.72 parts by mass. The BPDP2 component introduced into the polycarbonate resin was present at 50 mol % with respect to the total monomer components. The relative viscosity of the obtained polycarbonate resin was 0.20, the refractive index was 1.679, the Tg was 152° C. and the absolute value of the orientation birefringence was $5.0 \times 10^{-3}$.

Example 4

Pellets of a polycarbonate resin were obtained by the same method as Example 1, except for using 22.13 parts by mass of the BPDP2 of Example 1, and changing BPEF to 9,9-bis[4-(2-hydroxyethoxy)-3-phenyl]phenylfluorene (BOPPEF), at 22.15 parts by mass. The BPDP2 component introduced into the polycarbonate resin was present at 50 mol % with respect to the total monomer components. The relative viscosity of the obtained polycarbonate resin was 0.21, the refractive index was 1.670, the Tg was 165° C. and the absolute value of the orientation birefringence was $5.1 \times 10^{-3}$.

Example 5

Pellets of a polycarbonate resin were obtained by the same method as Example 1, except for using 47.22 parts by mass of the BPDP2 of Example 1 and changing BPEF to 2,2-bis(4-hydroxyphenyl)propane (hereunder also abbreviated as BPA), at 4.57 parts by mass. The BPDP2 component introduced into the polycarbonate resin was present at 80 mol % with respect to the total monomer components. The relative viscosity of the obtained polycarbonate resin was 0.20, the refractive index was 1.674, the Tg was 172° C. and the absolute value of the orientation birefringence was $4.9 \times 10^{-3}$.

Example 6

Pellets of a polycarbonate resin were obtained by the same method as Example 1, except for using 41.32 parts by mass of the BPDP2 of Example 1 and changing BPEF to bis(4-hydroxyphenyl) sulfide (hereunder also abbreviated as TDP), at 6.55 parts by mass. The BPDP2 component introduced into the polycarbonate resin was present at 70 mol % with respect to the total monomer components. The relative viscosity of the obtained polycarbonate resin was 0.23, the refractive index was 1.680, the Tg was 163° C. and the absolute value of the orientation birefringence was $2.3 \times 10^{-3}$.

Example 7

Pellets of a polycarbonate resin were obtained by the same method as Example 1, except for changing the BPDP2 of Example 1 to the BPDP3 synthesized in Reference Example 2, at 24.41 parts by mass, and using BPEF at 21.93 parts by mass. The BPDP3 component introduced into the polycarbonate resin was present at 50 mol % with respect to the total monomer components. The relative viscosity of the obtained polycarbonate resin was 0.22, the refractive index was 1.652, the Abbe number was 18, the Tg was 158° C. and the absolute value of the orientation birefringence was $3.0 \times 10^{-3}$.

Example 8

Pellets of a polycarbonate resin were obtained by the same method as Example 1, except for changing the BPDP2 of Example 1 to the BPDP4 synthesized in Reference Example 3, at 24.41 parts by mass, and using BPEF at 21.93 parts by mass. The BPDP4 component introduced into the polycarbonate resin was present at 50 mol % with respect to the total monomer components. The relative viscosity of the obtained polycarbonate resin was 0.22, the refractive index was 1.659, the Abbe number was 18, the Tg was 157° C. and the absolute value of the orientation birefringence was $4.0 \times 10^{-3}$.

Comparative Example 1

After placing 59.07 parts by mass of BOPPEF, 21.64 parts by mass of DPC and $4.20 \times 10^{-6}$ parts by mass of sodium hydrogencarbonate in a reaction kiln equipped with a stirrer and distillation device, nitrogen exchange was carried out 3 times, and the jacket was heated to 180° C. to melt the starting materials. After complete dissolution, the pressure was reduced to 20 kPa over a period of 5 minutes while simultaneously increasing the temperature of the jacket to 260° C. at a rate of 60° C./hr, for transesterification reaction. Next, the jacket was kept at 260° C. while reducing the pressure to 0.13 kPa over a period of 50 minutes, and polymerization reaction was carried out under conditions of 260° C., ≤0.13 kPa until a prescribed torque was reached. Upon completion of the reaction, the produced resin was extracted while being pelletized, to obtain 100% BOPPEF polycarbonate resin pellets. The relative viscosity of the obtained polycarbonate resin was 0.28, the refractive index was 1.657, the Abbe number was 21, the Tg was 154° C. and the absolute value of the orientation birefringence was $2.8 \times 10^{-3}$.

Comparative Example 2

Pellets of a polycarbonate resin were obtained by the same method as Comparative Example 1, except for using 29.54 parts by mass of the BOPPEF of Comparative Example 1, and 21.93 parts by mass of BPEF. The BOPPEF component introduced into the polycarbonate resin was present at 50 mol % with respect to the total monomer components. The relative viscosity of the obtained polycarbonate resin was 0.27, the refractive index was 1.648, the Abbe number was 22, the Tg was 151° C. and the absolute value of the orientation birefringence was $1.7 \times 10^{-3}$.

Comparative Example 3

Pellets of a polycarbonate resin were obtained by the same method as Comparative Example 2, except for changing the BOPPEF of Comparative Example 2 to BPA at 35.44 parts by mass, and using 17.54 parts by mass of BPEF. The BPA component introduced into the polycarbonate resin was present at 60 mol % with respect to the total monomer components. The relative viscosity of the obtained polycarbonate resin was 0.25, the refractive index was 1.615, the Abbe number was 26, the Tg was 146° C. and the absolute value of the orientation birefringence was $11.0 \times 10^{-3}$.

Example 9

After placing 29.51 parts by mass of BPDP2, 20.12 parts by mass of 2,2'-bis(carboxymethoxy)-1,1'-binaphthyl (hereunder also abbreviated as BCMB) and $3.40 \times 10^{-3}$ parts by mass of titanium tetrabutoxide in a reaction kiln equipped with a stirrer and distillation device, nitrogen exchange was carried out 3 times and then the jacket was heated to 180° C. to melt the starting materials. Next, the pressure was reduced to 40 kPa over a period of 20 minutes while simultaneously increasing the temperature of the jacket to 260° C. at a rate of 60° C./hr, for transesterification reaction. The pressure was then lowered to 0.13 kPa over a period of 70 minutes, and polymerization reaction was carried out under conditions of ≤0.13 kPa until a prescribed torque was reached. Upon completion of the reaction, the produced resin was extracted while being pelletized, to obtain polyester resin pellets. When the pellets were analyzed by $^1$H NMR, the total diol component introduced into the polyester resin was 50 mol % with respect to the total monomer components (total diol component+total dicarboxylic acid component), and the total carboxylic acid component introduced into the polyester resin was 50 mol % with respect to the total monomer components (total diol component+total dicarboxylic acid component). The relative viscosity of the obtained polyester resin was 0.20, the refractive index was 1.686, the Tg was 169° C. and the absolute value of the orientation birefringence was $4.7 \times 10^{-3}$.

Example 10

After placing 11.81 parts by mass of BPDP2, 11.23 parts by mass of BHEB, 20.12 parts by mass of BCMB and $3.40 \times 10^{-3}$ parts by mass of titanium tetrabutoxide in a reaction kiln equipped with a stirrer and distillation device, nitrogen exchange was carried out 3 times and then the jacket was heated to 180° C. to melt the starting materials.

Next, the pressure was reduced to 40 kPa over a period of 20 minutes while simultaneously increasing the temperature of the jacket to 260° C. at a rate of 60° C./hr, for transesterification reaction. The pressure was then lowered to 0.13 kPa over a period of 70 minutes, and polymerization reaction was carried out under conditions of ≤0.13 kPa until a prescribed torque was reached. Upon completion of the reaction, the produced resin was extracted while being pelletized, to obtain polyester resin pellets. The total diol components (BPDP2, BHEB) introduced into the polyester resin were 50 mol % with respect to the total monomer components (total diol component+total dicarboxylic acid component), and the total carboxylic acid component introduced into the polyester resin was 50 mol % with respect to the total monomer components (total diol component+total dicarboxylic acid component). The relative viscosity of the obtained polyester resin was 0.22, the refractive index was 1.682, the Tg was 152° C. and the absolute value of the orientation birefringence was $2.1 \times 10^{-3}$.

After drying the obtained resin at 120° C. for 4 hours, 0.05 wt % of bis(2,6-di-tert-butyl-4-methylphenyl)pentaerythritol diphosphite and 0.10 wt % of glycerin monostearate were added, based on the weight of the resin, and a vented φ5 mm twin-screw extruder was used for pelletizing: After drying the pellets at 120° C. for 4 hours, they were subjected to injection molding at a cylinder temperature of 280° C. and a mold temperature of 130° C., to obtain a lens with a thickness of 0.3 mm, a convex curvature radius of 5 mm and a concave curvature radius of 4 mm.

Example 11

After placing 23.61 parts by mass of BPDP2, 0.74 part by mass of ethylene glycol (hereunder also abbreviated as EG), 20.12 parts by mass of BCMB and $3.40 \times 10^{-3}$ parts by mass of titanium tetrabutoxide in a reaction kiln equipped with a stirrer and distillation device, nitrogen exchange was carried out 3 times and then the jacket was heated to 180° C. to melt the starting materials. Next, the jacket was increased in temperature to 230° C. at a rate of 60° C./hr, transesterification reaction was carried out, and a prescribed amount of water was distilled off. The jacket was then increased in temperature to 260° C. while simultaneously lowering the pressure to 0.13 kPa over a period of 80 minutes, after which polymerization reaction was carried out under conditions of ≤0.13 kPa until a prescribed torque was reached. Upon completion of the reaction, the produced resin was extracted while being pelletized, to obtain polyester resin pellets. The total diol components (BPDP2, EG) introduced into the polyester resin were 50 mol % with respect to the total monomer components (total diol component+total dicarboxylic acid component), and the total carboxylic acid component introduced into the polyester resin was 50 mol % with respect to the total monomer components (total diol component+total dicarboxylic acid component). The relative viscosity of the obtained polyester resin was 0.22, the refractive index was 1.684, the Tg was 163° C. and the absolute value of the orientation birefringence was $4.2 \times 10^{-3}$.

Example 12

Pellets of a polyester resin were obtained by the same method as Example 11, except for using 29.51 parts by mass of BPDP2 and 9.71 parts by mass of dimethyl terephthalate (hereunder also abbreviated as DMT). The total diol components introduced into the polyester resin were 50 mol % with respect to the total monomer components (total diol component+total dicarboxylic acid component), and the total carboxylic acid component introduced into the polyester resin was 50 mol % with respect to the total monomer components (total diol component+total dicarboxylic acid component). The relative viscosity of the obtained polyester resin was 0.24, the refractive index was 1.675, the Tg was 172° C. and the absolute value of the orientation birefringence was $6.4 \times 10^{-3}$.

Example 13

After placing 14.76 parts by mass of BPDP2, 11.23 parts by mass of BHEB, 18.11 parts by mass of BCMB, 2.57 parts by mass of DPC and $3.40 \times 10^{-3}$ parts by mass of titanium tetrabutoxide in a reaction kiln equipped with a stirrer and distillation device, nitrogen exchange was carried out 3 times and then the jacket was heated to 180° C. to melt the starting materials. Next, the pressure was reduced to 40 kPa over a period of 20 minutes while simultaneously increasing the temperature of the jacket to 260° C. at a rate of 60° C./hr, for transesterification reaction. The pressure was then lowered to 0.13 kPa over a period of 70 minutes, and polymerization reaction was carried out under conditions of ≤0.13 kPa until a prescribed torque was reached. Upon completion of the reaction, the produced resin was extracted while being pelletized, to obtain polyester carbonate resin pellets. The total diol components (BPDP2, BHEB) introduced into the polyester carbonate resin were 55 mol % with respect to the total monomer components (total diol component+total dicarboxylic acid component), and the total carboxylic acid component introduced into the polyester carbonate resin was 45 mol % with respect to the total monomer components (total diol component+total dicarboxylic acid component). The relative viscosity of the obtained polyester carbonate resin was 0.20, the refractive index was 1.684, the Abbe number was 17, the Tg was 151° C. and the absolute value of the orientation birefringence was $1.2 \times 10^{-3}$.

After drying the obtained resin at 120° C. for 4 hours, 0.05 wt % of bis(2,6-di-tert-butyl-4-methylphenyl)pentaerythritol diphosphite and 0.10 wt % of glycerin monostearate were added, based on the weight of the resin, and a vented φ15 mm twin-screw extruder was used for pelletizing. After drying the pellets at 120° C. for 4 hours, they were subjected to injection molding at a cylinder temperature of 280° C. and a mold temperature of 130° C., to obtain a lens with a thickness of 0.3 mm, a convex curvature radius of 5 mm and a concave curvature radius of 4 mm.

Example 14

Pellets of a polyester carbonate resin were obtained by the same method as Example 13, except for using 23.61 parts by mass of BPDP2, 13.11 parts by mass of BHEB, 10.06 parts by mass of BCMB and 12.85 parts by mass of DPC. The total diol components (BPDP2, BHEB) introduced into the polyester carbonate resin were 75 mol % with respect to the total monomer components (total diol component+total dicarboxylic acid component), and the total carboxylic acid component introduced into the polyester carbonate resin was 25 mol % with respect to the total monomer components (total diol component+total dicarboxylic acid component). The relative viscosity of the obtained polyester carbonate resin was 0.21, the refractive index was 1.680, the Tg was 155° C. and the absolute value of the orientation birefringence was $3.9 \times 10^{-3}$.

Example 15

Pellets of a polyester carbonate resin were obtained by the same method as Example 13, except for using 29.51 parts by mass of BPDP2 and 14.98 parts by mass of BHEB, changing BCMB to dimethyl naphthalenedicarboxylate (hereunder also abbreviated as NDCM) at 2.44 parts by mass, and using 20.57 parts by mass of DPC. The total diol components (BPDP2, BHEB) introduced into the polyester carbonate resin were 90 mol % with respect to the total monomer components (total diol component+total dicarboxylic acid component), and the total carboxylic acid component introduced into the polyester carbonate resin was 10 mol % with respect to the total monomer components (total diol component+total dicarboxylic acid component). The relative viscosity of the obtained polyester carbonate resin was 0.22, the refractive index was 1.679, the Tg was 155° C. and the absolute value of the orientation birefringence was $4.0 \times 10^{-3}$.

The results for the polycarbonate resins are shown in Table 1. The results for the polyester resins or polyester carbonate resins are shown in Table 2. The orientation birefringence values are listed as signs in parentheses.

BPDP2: 9,9-bis[4-(2-Hydroxyethoxy)phenyl]-2,7-diphenylfluorene
BPDP3: 9,9-bis[4-(2-Hydroxyethoxy)phenyl]-3,6-diphenylfluorene
BPDP4: 9,9-bis[4-(2-Hydroxyethoxy)phenyl]-4,5-diphenylfluorene
BPEF: 9,9-bis[4-(2-Hydroxyethoxy)phenyl]fluorene
BOPPEF: 9,9-bis[4-(2-Hydroxyethoxy)-3-phenylphenyl]fluorene
BHEB: 2,2'-bis(2-Hydroxyethoxy)-1,1'-binaphthyl
BPA: 2,2-bis(4-Hydroxyphenyl)propane
TDP: bis(4-Hydroxyphenyl)sulfide
EG: Ethylene glycol
BCMB: 2,2'-bis(Carboxymethoxy)-1,1'-binaphthyl
DMT: Dimethyl terephthalate
NDCM: Dimethyl naphthalenedicarboxylate The thermoplastic resins obtained in Examples 1 to 15 had high refractive indexes and low Abbe numbers, as well as excellent balance between heat resistance and moldability and low birefringence, and they are therefore suitable for optical lenses. In contrast, the thermoplastic resins of the comparative examples had low refractive indexes and high Abbe numbers.

TABLE 1

| | Compositional ratio | | | | | | | | Evaluation results | | | |
|---|---|---|---|---|---|---|---|---|---|---|---|---|
| | Diol | | | | | | | | Relative | Refractive | | Δn |
| | BPDP2 mol % | BPDP3 mol % | BPDP4 mol % | BPEF mol % | BOPPEF mol % | BHEB mol % | BPA mol % | TDP mol % | viscosity | index (nD) | Tg ° C. | (× 10⁻³) |
| Example 1 | 50 | — | — | 50 | — | — | — | — | 0.22 | 1.664 | 161 | 4.8 (−) |
| Example 2 | 100 | — | — | — | — | — | — | — | 0.20 | 1.683 | 175 | 8.5 (−) |
| Example 3 | 50 | — | — | — | — | 50 | — | — | 0.20 | 1.679 | 152 | 5.0 (−) |
| Example 4 | 50 | — | — | — | 50 | — | — | — | 0.21 | 1.670 | 165 | 5.1 (−) |
| Example 5 | 80 | — | — | — | — | — | 20 | — | 0.20 | 1.674 | 172 | 4.9 (−) |
| Example 6 | 70 | — | — | — | — | — | — | 30 | 0.23 | 1.680 | 163 | 2.3 (−) |
| Example 7 | — | 50 | — | 50 | — | — | — | — | 0.22 | 1.652 | 158 | 3.0 (−) |
| Example 8 | — | — | 50 | 50 | — | — | — | — | 0.22 | 1.659 | 157 | 4.0 (−) |
| Comp. Ex. 1 | — | — | — | — | 100 | — | — | — | 0.28 | 1.657 | 154 | 2.8 (−) |
| Comp. Ex. 2 | — | — | — | 50 | 50 | — | — | — | 0.27 | 1.648 | 151 | 1.7 (−) |
| Comp. Ex. 3 | — | — | — | 40 | — | 60 | — | — | 0.25 | 1.615 | 146 | 11.0 (+) |

TABLE 2

| | Compositional ratio | | | | | | Evaluation results | | | |
|---|---|---|---|---|---|---|---|---|---|---|
| | Diol | | | Dicarboxylic Acid | | | Relative | Refractive | | Δn |
| | BPDP2 mol % | BHEB mol % | EG mol % | BCMB mol % | DMT mol % | NDCM mol % | viscosity | index (nD) | Tg ° C. | (× 10⁻³) |
| Example 9 | 50 | — | — | 50 | — | — | 0.20 | 1.686 | 169 | 4.7 (−) |
| Example 10 | 20 | 30 | — | 50 | — | — | 0.22 | 1.682 | 152 | 2.1 (−) |
| Example 11 | 40 | — | 10 | 50 | — | — | 0.22 | 1.684 | 163 | 4.2 (−) |
| Example 12 | 50 | — | — | — | 50 | — | 0.24 | 1.675 | 172 | 6.4 (−) |
| Example 13 | 25 | 30 | — | 45 | — | — | 0.20 | 1.684 | 151 | 1.2 (−) |
| Example 14 | 40 | 35 | — | 25 | — | — | 0.21 | 1.680 | 155 | 3.9 (−) |
| Example 15 | 50 | 40 | — | — | — | 10 | 0.22 | 1.679 | 155 | 4.0 (−) |

The thermoplastic resins composed of monomers having aromatic groups introduced into a fluorene backbone, such as BPDP2, BPDP3 and BPDP4, are more effective for excellent molecular packing properties, high refractive index, low Abbe number and high heat resistance, compared to BOPPEF having an aromatic group introduced in the main chain.

Experiment 2: Examining Thermoplastic Resins with $Ar^1$ and $Ar^2$ as Naphthyl Groups Reference Example 4 (Synthesis of 9,9-bis(4-(2-hydroxyethoxy)phenyl)-2,7-di(2-naphthyl)fluorene (BPDN2))

(4-1) Synthesis of 9,9-bis(2-hydroxyethoxy)phenyl)-2,7-dibromofluorene

After charging 150 g of toluene as a solvent and 2.19 g of 12-phosphotungstic(VI) acid n-hydrate ($H_3[PW_{12}O_{40}]$ $\cdot nH_2O$) into a 500 mL flask equipped with a stirrer, cooler and thermometer, azeotropic dehydration was carried out with toluene circulation. After cooling the contents, 33.8 g (0.10 mol) of 2,7-dibromofluorenone (hereunder also abbreviated as DBFN) and 55.3 g (0.40 mol) of 2-phenoxyethanol were added, and the mixture was stirred for 18 hours with toluene circulation while the water generated by the reaction was discharged out of the system. Progression of the reaction was appropriately confirmed by HPLC, and the reaction was completed upon confirming a DBFN residue amount of no greater than 0.1 wt %. The obtained 9,9-bis(2-hydroxyethoxy)phenyl)-2,7-dibromofluorene (hereunder also abbreviated as BPDB) was directly transferred to the reaction of the subsequent step b without isolation or purification.

(4-2) Synthesis of BPDN2

After cooling the reaction mixture observed in step 4-1 to room temperature, 58 mL of a 4 M potassium carbonate aqueous solution, 36.1 g (0.21 mol) of 2-naphthaleneboronic acid and 1.1 g (0.97 millimole) of tetrakis(triphenylphosphinepalladium) were added, and the mixture was stirred at 80° C. for 2 hours for reaction. Progression of the reaction was confirmed by HPLC, and the reaction was completed upon confirming a BPDB residue amount of no greater than 0.1 wt %. The obtained reaction mixture was cooled to room temperature, and after adding ethanol to produce crystallization, the solid was filtered and collected. The collected solid was dissolved in chloroform and rinsed 3 times with hot water, after which the chloroform layer was subjected to decoloration treatment with active carbon and treated for palladium removal, and subsequently concentrated to obtain a partially purified product. The obtained partially purified solid product was recrystallized with toluene to obtain 58 g of white crystals of the target substance, 9,9-bis(4-(2-hydroxyethoxy)phenyl)-2,7-di(2-naphthyl)fluorene (yield: 80%, purity: 98%). Measurement of the residual metals by ICP analysis showed Pd at 2.0 ppm. HPLC measurement showed that impurities of compounds represented by formula (1) where m=1 and n=0, were present at 1% in the obtained white crystals.

Reference Example 5 (Synthesis of 9,9-bis(4-(2-hydroxyethoxy)phenyl)-2,7-di(1-naphthyl)fluorene (BPDN1))

A white solid of BPDN1 was obtained in the same manner as Reference Example 4, except for changing the 2-naphthaleneboronic acid of Reference Example 4-1 to 1-naphthaleneboronic acid. (Yield: 80%, purity: 98%). Measurement of the residual metals by ICP analysis showed Pd at 2.1 ppm.

Example 16

After placing 69.08 parts by mass of the BPDN2 synthesized in Reference Example 4, 21.85 parts by mass of diphenyl carbonate (hereunder also abbreviated as DPC) and $42.0 \times 10^{-5}$ parts by mass of sodium hydrogencarbonate in a reaction kiln equipped with a stirrer and distillation device, nitrogen exchange was carried out 3 times, and the jacket was heated to 180° C. to melt the starting materials. After complete dissolution, the pressure was reduced to 20 kPa over a period of 5 minutes while simultaneously increasing the temperature of the jacket to 260° C. at a rate of 60° C./hr, for transesterification reaction. Next, the jacket was kept at 260° C. while reducing the pressure to 0.13 kPa over a period of 50 minutes, and polymerization reaction was carried out under conditions of 260° C., ≤0.13 kPa until a prescribed torque was reached. Upon completion of the reaction, the produced resin was extracted while being pelletized, to obtain polycarbonate resin pellets. The relative viscosity of the obtained polycarbonate resin was 0.24, the refractive index was 1.728, the Tg was 183° C. and the absolute value of the orientation birefringence was $19.0 \times 10^{-3}$.

After drying the obtained resin at 120° C. for 4 hours, 0.05 wt % of bis(2,6-di-tert-butyl-4-methylphenyl)pentaerythritol diphosphite and 0.10 wt % of glycerin monostearate were added, based on the weight of the resin, and a vented φ5 mm twin-screw extruder was used for pelletizing. After drying the pellets at 120° C. for 4 hours, they were subjected to injection molding at a cylinder temperature of 280° C. and a mold temperature of 130° C., to obtain a lens with a thickness of 0.3 mm, a convex curvature radius of 5 mm and a concave curvature radius of 4 mm.

The composition was changed as listed in Table 3, to obtain polycarbonate resin pellets for Examples 17 to 30. The evaluation results are shown in Table 3.

Figure 3:
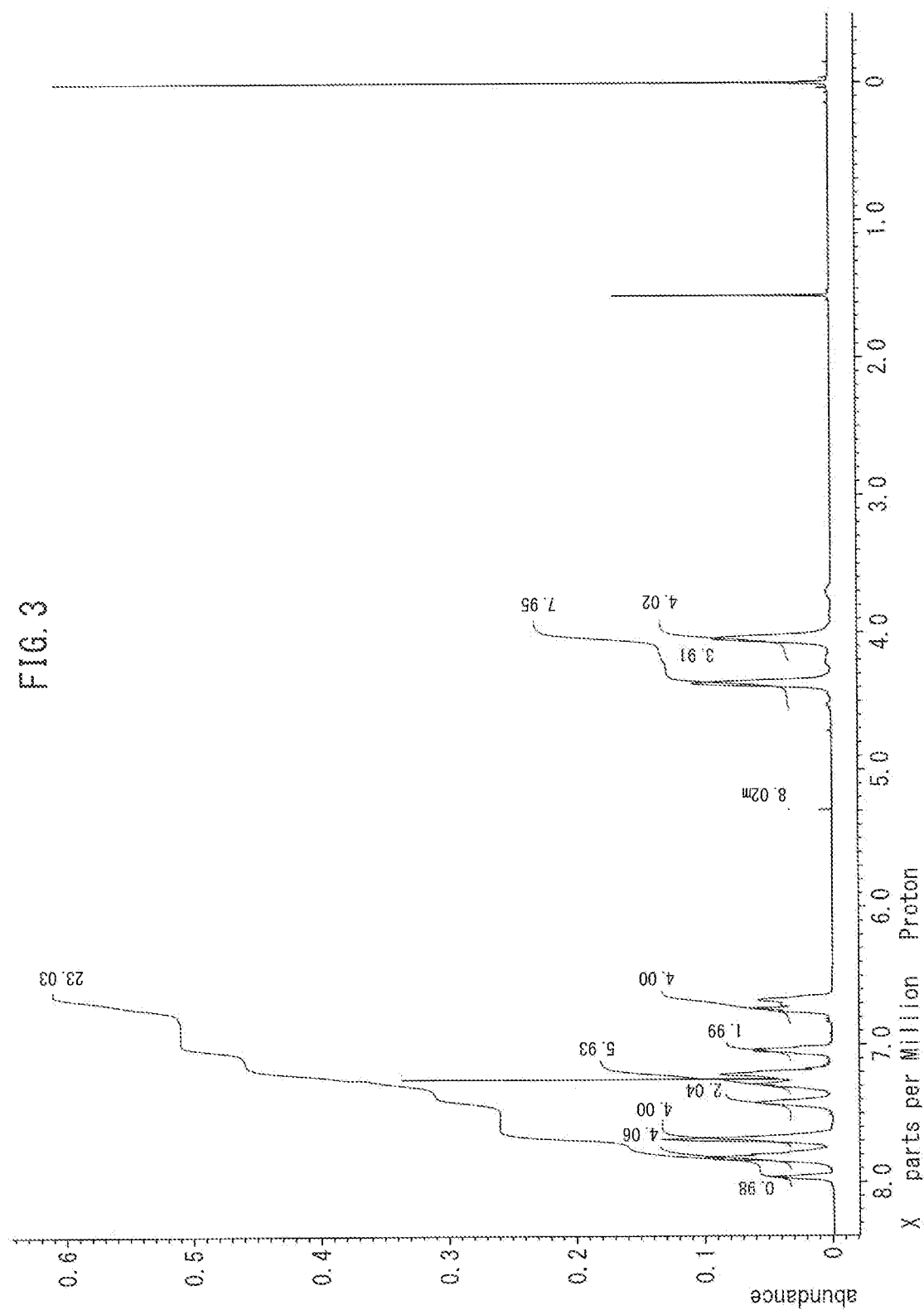
FIG. 3 shows the $^1$H NMR of the polycarbonate resin obtained in Example 17.
Figure 4:
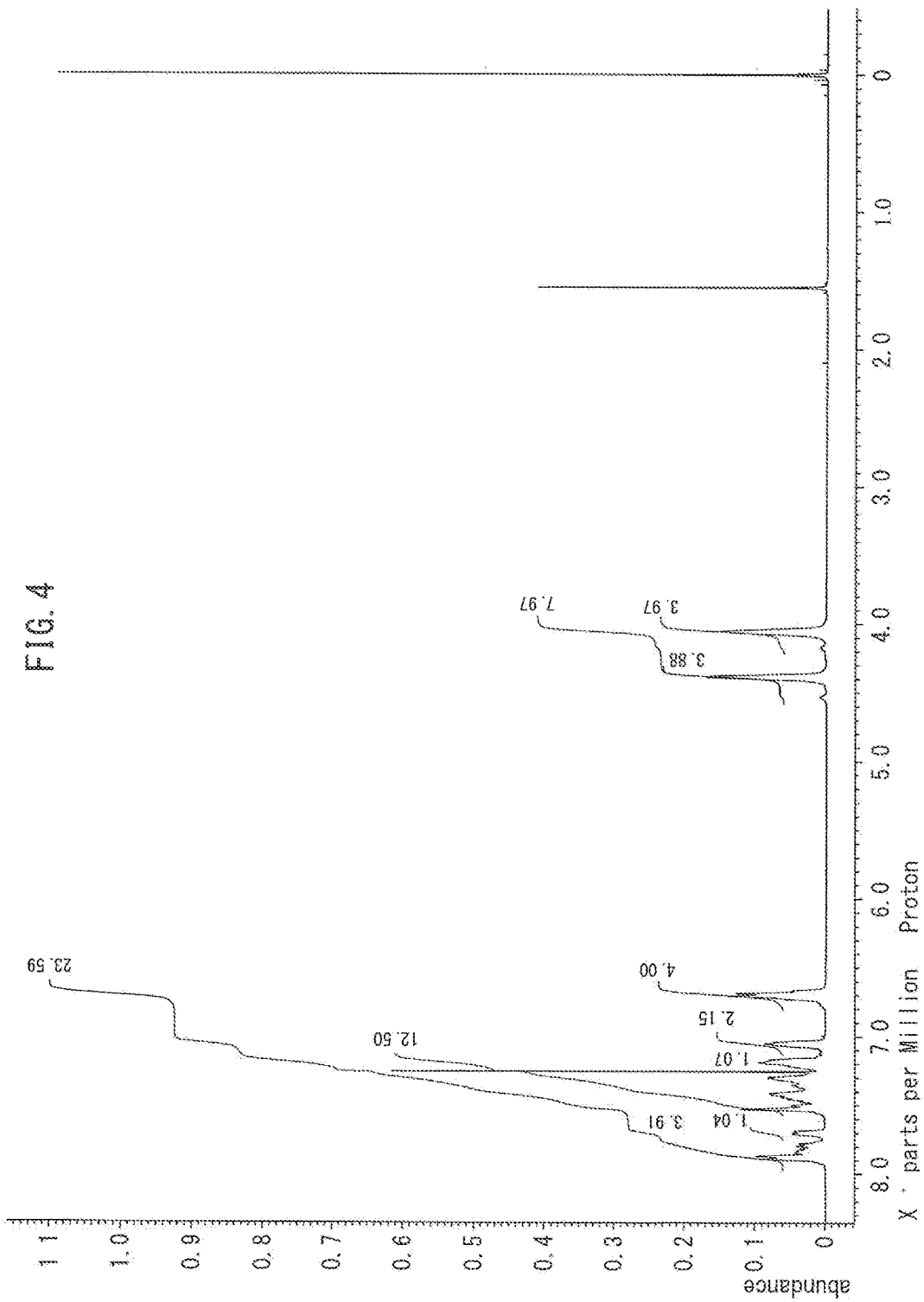
FIG. 4 shows the $^1$H NMR of the polycarbonate resin obtained in Example 25.

The $^1$H NMR results for Example 17 and Example 25 are also shown in FIG. 3 and FIG. 4.

Example 31

After placing 13.82 parts by mass of BPDN2, 14.98 parts by mass of BHEB, 9.77 parts by mass of NDCM, 6.86 parts by mass of DPC and $17.0 \times 10^{-3}$ parts by mass of titanium tetrabutoxide in a reaction kiln equipped with a stirrer and distillation device, nitrogen exchange was carried out 3 times, and the jacket was heated to 180° C. to melt the starting materials. Next, the pressure was reduced to 40 kPa over a period of 20 minutes while simultaneously increasing the temperature of the jacket to 260° C. at a rate of 60° C./hr, for transesterification reaction. The pressure was then lowered to 0.13 kPa over a period of 70 minutes, and polymerization reaction was carried out under conditions of ≤0.13 kPa until a prescribed torque was reached. Upon completion of the reaction, the produced resin was extracted while being pelletized, to obtain polyester carbonate resin pellets. When the pellets were analyzed by $^1$H NMR, the total diol components introduced into the polyester carbonate resin were 60 mol % with respect to the total monomer components (total diol component+total dicarboxylic acid component), and the total carboxylic acid component introduced into the polyester carbonate resin was 40 mol % with respect to the total monomer components (total diol component+total dicarboxylic acid component). The relative viscosity of the obtained polyester carbonate resin was 0.20, the refractive index was 1.694, the Tg was 152° C. and the orientation birefringence was −5.9×10⁻³.

The composition was changed as listed in Table 4, to obtain polyester resin or polyester carbonate resin pellets for Examples 32 to 36. The evaluation results are shown in Table 4.

The results for the polycarbonate resins are shown in Table 3. The results for the polyester resins or polyester carbonate resins are shown in Table 4. The orientation birefringence values are listed as signs in parentheses.

matic groups introduced at the side chains of polymers with a fluorene backbone, and it was demonstrated that they are more effective for excellent molecular packing properties, high refractive index, low Abbe number and high heat resistance, compared to a thermoplastic resin obtained from BOPPEF that has an aromatic group introduced in the main chain.

Thermoplastic resins obtained from monomers such as BPDN1 and BPDN2 have naphthyl groups introduced into the side chains of polymers with a fluorene backbone, and thermoplastic resins composed of these monomers are effective for excellent molecular packing properties, high refrac-

TABLE 3

| | Compositional ratio | | | | | | Evaluation results | | | |
|---|---|---|---|---|---|---|---|---|---|---|
| | Diol | | | | | | Relative | Refractive | | Δn |
| | BPDN2 mol % | BPDN1 mol % | BPEF mol % | BNEF mol % | BHEB mol % | BPA mol % | TDP mol % | viscosity — | index (nD) — | Tg ° C. | (× 10⁻³) — |
| Example 16 | 100 | — | — | — | — | — | — | 0.24 | 1.728 | 183 | 19.0 (−) |
| Example 17 | 50 | — | 50 | — | — | — | — | 0.21 | 1.692 | 169 | 13.0 (−) |
| Example 18 | 50 | — | — | 50 | — | — | — | 0.21 | 1.708 | 181 | 7.5 (−) |
| Example 19 | 50 | — | — | — | 50 | — | — | 0.24 | 1.707 | 160 | 12.3 (−) |
| Example 20 | 20 | — | — | 30 | 50 | — | — | 0.20 | 1.690 | 156 | 2.9 (−) |
| Example 21 | 50 | — | — | — | — | 50 | — | 0.23 | 1.693 | 174 | 8.2 (−) |
| Example 22 | 40 | — | — | — | — | — | 60 | 0.20 | 1.707 | 151 | 3.4 (−) |
| Example 23 | 30 | — | — | 15 | — | — | 55 | 0.20 | 1.700 | 154 | 0.5 (+) |
| Example 24 | — | 100 | — | — | — | — | — | 0.23 | 1.692 | 177 | 0.4 (+) |
| Example 25 | — | 50 | 50 | — | — | — | — | 0.22 | 1.671 | 166 | 0.1 (−) |
| Example 26 | — | 40 | — | — | 60 | — | — | 0.19 | 1.681 | 149 | 0.3 (+) |
| Example 27 | — | 25 | — | 50 | 25 | — | — | 0.20 | 1.685 | 167 | 4.2 (+) |
| Example 28 | 50 | 50 | — | — | — | — | — | 0.25 | 1.710 | 181 | 9.3 (−) |
| Example 29 | 10 | 50 | — | — | 40 | — | — | 0.20 | 1.690 | 162 | 2.0 (−) |
| Example 30 | 30 | 15 | — | — | — | — | 55 | 0.20 | 1.701 | 155 | 0.8 (−) |

TABLE 4

| | Compositional ratio | | | | | | | Evaluation results | | | |
|---|---|---|---|---|---|---|---|---|---|---|---|
| | Diol | | | | | Dicarboxylic Acid | | Relative | Refractive | | Δn |
| | BPDP2 mol % | BPDN1 mol % | BHEB mol % | TDP mol % | EG mol % | BCMB mol % | NDCM mol % | viscosity — | index (nD) — | Tg ° C. | (× 10⁻³) — |
| Example 31 | 20 | — | 40 | — | — | — | 40 | 0.20 | 1.694 | 152 | 5.9 (−) |
| Example 32 | 25 | — | 30 | — | — | 45 | — | 0.19 | 1.703 | 148 | 8.8 (−) |
| Example 33 | 25 | — | — | 30 | — | 45 | — | 0.21 | 1.702 | 158 | 3.2 (−) |
| Example 34 | 25 | — | — | — | 25 | — | 50 | 0.22 | 1.704 | 163 | 6.6 (−) |
| Example 35 | 20 | — | 40 | — | — | — | 40 | 0.21 | 1.695 | 155 | 4.0 (−) |
| Example 36 | — | 25 | 30 | — | — | 45 | — | 0.21 | 1.685 | 155 | 0.3 (+) |

BPDN2: 9,9-bis[4-(2-Hydroxyethoxy)phenyl]-2,7-di(2-naphthyl)fluorene
BPDN1: 9,9-bis[4-(2-Hydroxyethoxy)phenyl]-2,7-di(1-naphthyl)fluorene
BPEF: 9,9-bis[4-(2-Hydroxyethoxy)phenyl]fluorene
BNEF: 9,9-bis[6-(2-Hydroxyethoxy)naphthyl]fluorene
BHEB: 2,2'-bis(2-Hydroxyethoxy)-1,1'-binaphthyl
BPA: 2,2-bis(4-Hydroxyphenyl)propane
TDP: bis(4-Hydroxyphenyl)sulfide
EG: Ethylene glycol
BCMB: 2,2'-bis(Carboxymethoxy)-1,1'-binaphthyl
DMT: Dimethyl terephthalate
NDCM: Dimethyl naphthalenedicarboxylate The thermoplastic resins obtained from monomers such as BPDP2, BPDP3, BPDP4, BPDN1 and BPDN2 have arotive index, low Abbe number and high heat resistance. BPDN2, in particular, has an exceedingly superior high refractive index.

INDUSTRIAL APPLICABILITY

The thermoplastic resin of the invention can be used as an optical material, and may be used in an optical member such as a lens, prism, optical disk, transparent conductive panel, optical card, sheet, film, optical fiber, optical film, optical filter or hard coat film, being very useful especially as a lens.

The invention claimed is:
1. A thermoplastic resin that includes a repeating unit represented by the following formula (1):

(1)

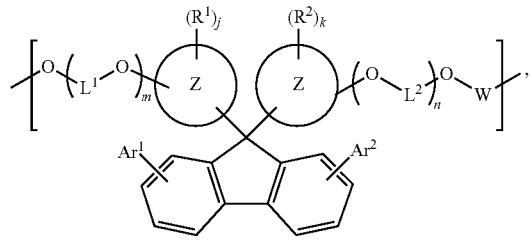

wherein the rings Z represent (the same or different) aromatic hydrocarbon rings, $R^1$ and $R^2$ each independently represent a hydrogen atom, a halogen atom or a hydrocarbon group of 1 to 12 carbon atoms optionally containing an aromatic group, $Ar^1$ and $Ar^2$ represent an aromatic group of 6 to 10 carbon atoms optionally containing a substituent, $L^1$ and $L^2$ are ethylene groups, j and k each independently represent an integer of 0 or greater, m and n are 1, and W is at least one group selected from groups represented by the following formula (2) or (3):

(2)

$$\underset{O}{\overset{\phantom{x}}{\underset{|}{\overset{|}{\text{C}}}}}$$

(3)

$$\underset{O\phantom{xx}O}{\overset{\phantom{x}}{\underset{\|\phantom{xx}\|}{\overset{|\phantom{xx}|}{\text{C—X—C}}}}},$$

wherein X represents a divalent linking group.

2. The thermoplastic resin according to claim 1, wherein formula (1) is at least one selected from the group consisting of units represented by the following formulas (1a) to (1d):

(1a)

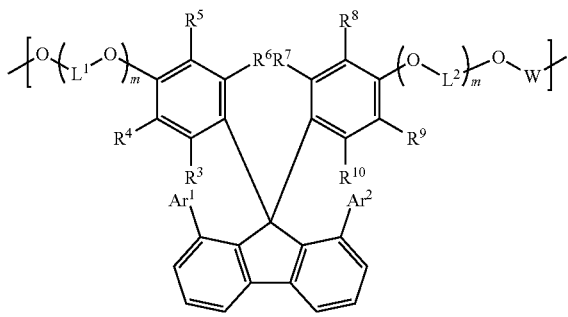

(1b)

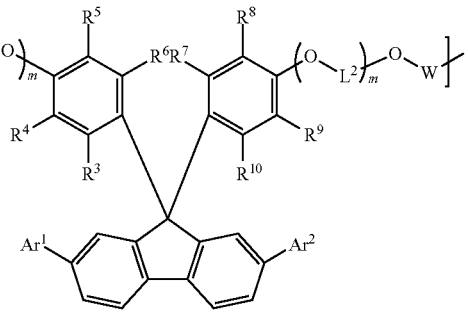

(1c)

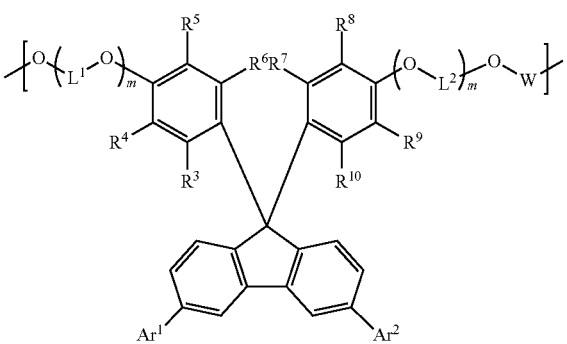

(1d)

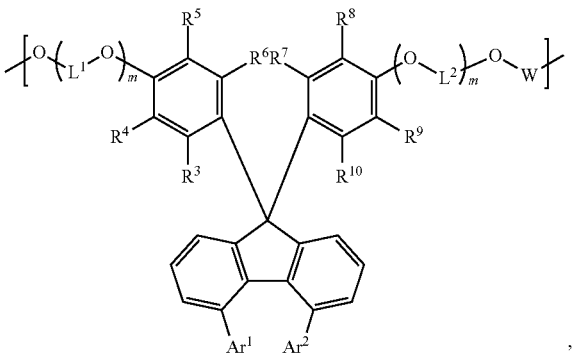

wherein $R^3$ to $R^{10}$ each independently represent a hydrogen atom, a halogen atom or a hydrocarbon group of 1 to 12 carbon atoms optionally containing an aromatic group, $Ar^1$ and $Ar^2$, $L^1$ and $L^2$, j and k, m and n and W are the same as in formula (1) above.

3. The thermoplastic resin according to claim 2, wherein formula (1) is at least one selected from the group consisting of units represented by formulas (1b) to (1d) above.

4. The thermoplastic resin according to claim 3, wherein formula (1) is formula (1b).

5. The thermoplastic resin according to claim 1, wherein $Ar^1$ and $Ar^2$ in formula (1) are phenyl groups.

6. The thermoplastic resin according to claim 1, wherein $Ar^1$ and $Ar^2$ in formula (1) are naphthyl groups.

7. The thermoplastic resin according to claim 4, wherein $Ar^1$ and $Ar^2$ in formula (1b) are phenyl groups, and $R^3$ to $R^{10}$ are hydrogen atoms.

8. The thermoplastic resin according to claim 1, wherein X in formula (3) includes at least one selected from the group consisting of phenylene group, naphthalenediyl group, groups represented by the following formula (4) and groups represented by the following formula (5), as a repeating unit:

(4)

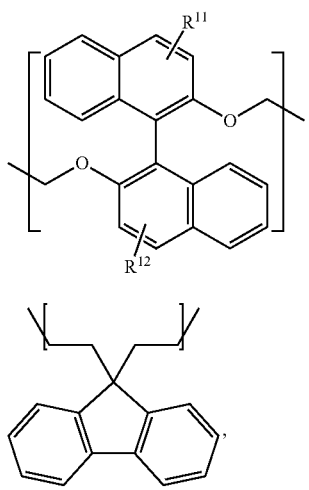

(5)

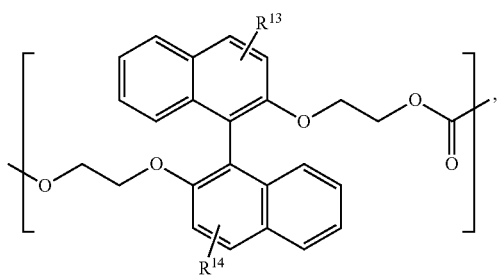

wherein R$^{11}$ and R$^{12}$ each independently represent a hydrogen atom, a hydrocarbon group of 1 to 12 carbon atoms optionally containing an aromatic group, or a halogen atom.

9. The thermoplastic resin according to claim 1, which includes at least one selected from the group consisting of units represented by the following formulas (6) to (8), as a repeating unit:

(6)

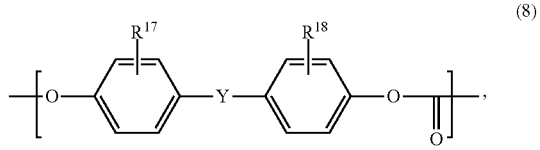

wherein R$^{13}$ and R$^{14}$ each independently represent a hydrogen atom, a hydrocarbon group of 1 to 12 carbon atoms optionally containing an aromatic group, or a halogen atom, (7)

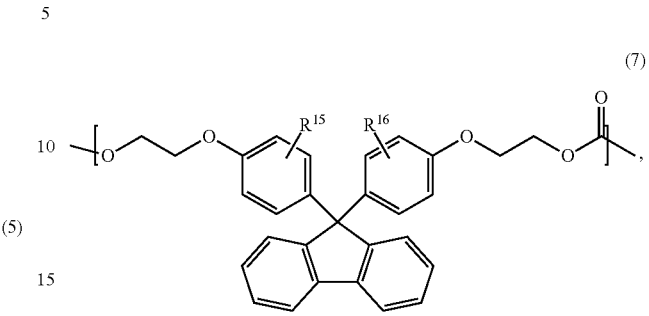

wherein R$^{15}$ and R$^{16}$ each independently represent a hydrogen atom, a hydrocarbon group of 1 to 12 carbon atoms optionally containing an aromatic group, or a halogen atom, (8)

$$-\!\left[\mathrm{O}\!-\!\!\!\underset{R^{17}}{\underset{|}{\bigcirc}}\!\!\!-\!Y\!-\!\!\!\underset{R^{18}}{\underset{|}{\bigcirc}}\!\!\!-\!\mathrm{O}\!-\!\!\overset{\mathrm{O}}{\underset{\|}{\mathrm{C}}}\right]\!-,$$

wherein R$^{17}$ and R$^{18}$ each independently represent a hydrogen atom, a hydrocarbon group of 1 to 12 carbon atoms optionally containing an aromatic group, or a halogen atom, and Y is a single bond or a divalent linking group.

10. The thermoplastic resin according to claim 1, wherein the relative viscosity is 0.12 to 0.40.

11. The thermoplastic resin according to claim 1, wherein the glass transition temperature is 140 to 185° C.

12. The thermoplastic resin according to claim 1, wherein the refractive index is 1.660 to 1.730.

13. An optical member comprising a thermoplastic resin according to claim 1.

14. The optical member according to claim 13, which is an optical lens.

* * * * *